(12) United States Patent
Sukegawa et al.

(10) Patent No.: US 8,064,651 B2
(45) Date of Patent: Nov. 22, 2011

(54) BIOMETRIC DETERMINATION OF GROUP MEMBERSHIP OF RECOGNIZED INDIVIDUALS

(75) Inventors: Hiroshi Sukegawa, Yokohama (JP); Makoto Shimizu, Odawara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1131 days.

(21) Appl. No.: 11/705,795

(22) Filed: Feb. 14, 2007

(65) Prior Publication Data

US 2007/0189585 A1 Aug. 16, 2007

(30) Foreign Application Priority Data

Feb. 15, 2006 (JP) .................................. 2006-038266

(51) Int. Cl.
*G06K 9/00* (2006.01)
(52) U.S. Cl. .................. 382/118; 340/5.53; 340/5.83
(58) Field of Classification Search .................. None
See application file for complete search history.

(56) References Cited

U.S. PATENT DOCUMENTS

| | | | |
|---|---|---|---|
| 4,627,193 A | 12/1986 | Schwarz | |
| 6,418,235 B1 | 7/2002 | Morimoto et al. | |
| 6,445,810 B2 | 9/2002 | Darrell et al. | 382/115 |
| 6,734,783 B1 | 5/2004 | Anbai | |
| 6,801,640 B1 | 10/2004 | Okubo et al. | |
| 7,551,755 B1 * | 6/2009 | Steinberg et al. | 382/118 |
| 2003/0039380 A1 * | 2/2003 | Sukegawa et al. | 382/118 |
| 2003/0215115 A1 * | 11/2003 | Kim et al. | 382/118 |
| 2004/0008873 A1 | 1/2004 | Sogo et al. | |
| 2008/0310688 A1 * | 12/2008 | Goldberg | 382/118 |

FOREIGN PATENT DOCUMENTS

| | | |
|---|---|---|
| DE | 36 23 792 C1 | 12/1987 |
| EP | 1 515 558 A1 | 3/2005 |
| JP | 11-175724 | 7/1999 |
| JP | 2000-348227 | 12/2000 |
| JP | 2001-256496 | 9/2001 |
| JP | 2004-362283 | 12/2004 |
| TW | 556126 | 10/2003 |

OTHER PUBLICATIONS

Taiwanese Office Action dated Jun. 7, 2010 for Appln. No. 96105570.
European Search Report dated May 23. 2007, Appln. No. 07003138.0-2218.

(Continued)

*Primary Examiner* — Bhavesh Mehta
*Assistant Examiner* — Barry Drennan
(74) *Attorney, Agent, or Firm* — Pillsbury Winthrop Shaw Pittman, LLP

(57) ABSTRACT

A person identification device obtains information including biometric information of a person, detects the biometric information of at least one person from the obtained information, collates each detected biometric information with the biometric information of at least one registrant associated with group information and stored in a storage unit to thereby identify the person having the biometric information detected from the obtained information, classifies a plurality of successively identified persons into group candidates based on predetermined conditions, divides the persons of the group candidates into groups based on the group information of each person stored in the storage unit, and outputs a grouping result to an external device.

26 Claims, 24 Drawing Sheets

OTHER PUBLICATIONS

Cupillard F et al.; "Group Behavior Recognition with Multiple Cameras"; Applications of computer Vision; 2002; Proceedings; Sixth IEEE Workshop on Dec. 3-4 2002; Piscataway, NJ, USA IEEE; Dec. 12, 2002; pp. 177-183, XP010628745; ISBN: 0-7695-1858-3.

Kazuhiro Fukui et al, Facial Feature Point Extraction by Combination of Geometry Extraction and Pattern Collation, Journal of the Institute of Electronics, Information and Communication Engineers (D), vol. JBO-DII, No. 8, pp. 2170 to 2177 (1997).

Mayumi Yuasa et al., "Digital Make System based on High-Precision Facial Feature Point Detection", the 10 1st Image Sensing Symposium Digests, pp. 219 to 224 (2004).

Ken* Maeda et al., "Pattern Matching Technique with introduced Local Structure", the Institute of Electronics, Information and Communication Engineers @), vol. J68-D, No. 3, pp. 345 to 352 (1985).

* cited by examiner

FIG. 3

| Identification information | Facial feature information | Face image | Group number, group information | | | | |
|---|---|---|---|---|---|---|---|
| | | | 1<br>Important customers | 2<br>President family | 3<br>Group requiring caution | ... | N |
| Person A | Feature A | Face image A | ○ | | | ... | |
| Person B | Feature B | Face image B | ○ | | | ... | |
| Person C | Feature C | Face image C | ○ | ○ | | ... | |
| Person D | Feature D | Face image D | | ○ | | ... | |
| Person E | Feature E | Face image E | | | ○ | ... | |
| Person F | Feature F | Face image F | | | ○ | ... | |

FIG. 4

| Number of non-registrants | Gate 1 | Gate 2 | ... | Gate N |
|---|---|---|---|---|
| Group 1 | 0 | | | |
| Group 2 | 3 | | | |
| ... | 2 | | | |

FIG. 7

| | Feature information of facial | Face image | Person attribute information |||||
|---|---|---|---|---|---|---|---|
| | | | Age | Gender | Importance | Requiring caution | Requiring assistance | ... |
| Person A | Feature A | Face image A | 25 | Male | | | | |
| Person B | Feature B | Face image B | 30 | Female | | | ○ | |
| Person C | Feature C | Face image C | 34 | Male | ○ | | | |
| Person D | Feature D | Face image D | 44 | Male | ○ | | | |
| Person E | Feature E | Face image E | 50 | Male | | ○ | | |
| Person F | Feature F | Face image F | 46 | Male | | ○ | | |

FIG. 8

| | Gate 1 | Gate 2 | ... | Gate N |
|---|---|---|---|---|
| Number of important persons | 2 | | | |
| Number of persons requiring caution | 0 | | | |
| Number of persons requiring assistance | 1 | | | |
| Number of non-registrants | 0 | | | |

| History number | Date | Number of persons in one screen | Identification result | Relevancy ("Level 3" > "Level 2" > "Level 1" > "Level 0") |
|---|---|---|---|---|
| 1 | 2006.12.28.14:00 | 1 person (A) | Identified as person A | |
| 2 | 2006.12.28.14:01 | 1 person (B) | Identified as person B | ·Judge relevancy between persons A and B to be "Level 2" |
| 3 | 2006.12.28.14:05 | 3 persons (C, D, E) | Identified as persons C, D and E | ·Judge relevancy between person B and persons C, D and E to be "Level 1"<br>·Judge relevancy between persons C, D and E to be "Level 3" |
| 4 | 2006.12.28.17:10 | 1 person (F) | Identified as person F | ·Judge that person has little relevancy to previous persons C, D and E, and is alone ("Level 3") (not associated with others) |

F I G. 11

| Person | A | B | C | D | E | F |
|---|---|---|---|---|---|---|
| A | — | 2 | | | | |
| B | 2 | — | 1 | 1 | 1 | |
| C | | 1 | — | 1 | 1 | |
| D | | 1 | 3 | — | 3 | |
| E | | 1 | 3 | 3 | — | |
| F | | | | | | — |

F I G. 12

| Time | Gate | Group 1 | Group 2 | Group 3 | ... | Group N |
|------|------|---------|---------|---------|-----|---------|
| 10:00 | Gate 1 | A, B, C | | | | |
| 10:10 | Gate 1 | | D, E | | | |
| 10:20 | Gate 1 | | | G, H, I | | |
| 10:30 | Gate 2 | A, B, C | | | | |
| 10:40 | Gate 2 | A, B, C | | | | |
| 10:50 | Gate 2 | | D, E, F | | | |
| 11:00 | Gate 1 | A, C | | G, H, I | | |
| 11:30 | Gate 2 | | D, E | | | |
Passer-by B was absent
Passer-by F was absent
Passers-by F increased
F I G. 15
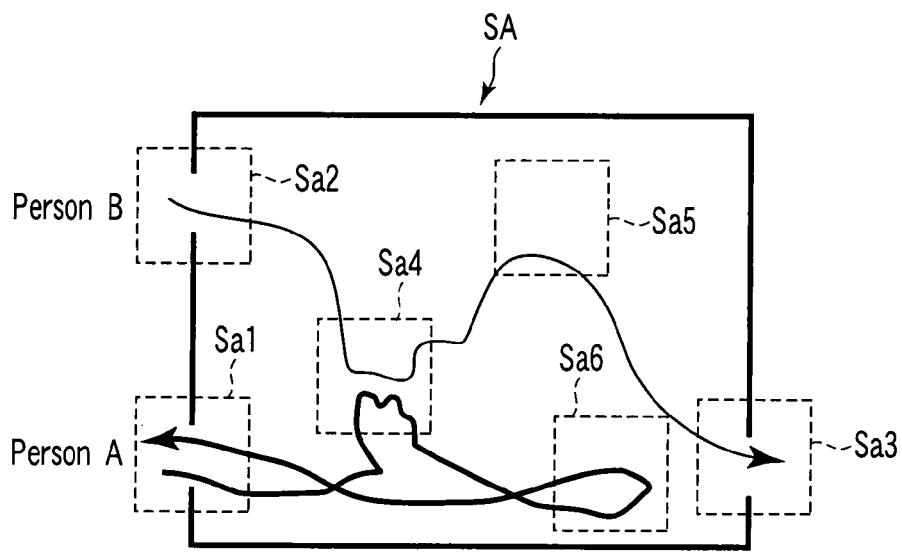
F I G. 16

|  | Person A | Person B | Person C | Person D | ... | Person Z |
|---|---|---|---|---|---|---|
| Person A | — | 12 | 0 | 1 | ... | 0 |
| Person B | 12 | — | 0 | 0 | ... | 0 |
| Person C | 0 | 0 | — | 0 | ... | 0 |
| Person D | 1 | 0 | 0 | — | ... | 1 |
| ... |  |  |  |  | ... |  |
| Person Z | 0 | 0 | 0 | 1 | ... | — |

F I G. 18

| | Monitoring area Sa1 | Monitoring area Sa2 | Monitoring area Sa3 | ... | Monitoring area San | General judgement value |
|---|---|---|---|---|---|---|
| Importance degree | 3 | 1 | 2 | | 5 | |
| Number of non-registrants | 0 | 1 | 1 | | 0 | 3 |
| Group 1 | 3 | 0 | 0 | | 0 | 30 |
| Group 2 | 0 | 0 | 0 | | 2 | 10※ |
| ... | | | | | | |

F I G. 20

| History number | Date | Person in one screen | Group judgment result | Relevancy ("Level 3" > "Level 2" > "Level 1") |
|---|---|---|---|---|
| 1 | 2006.12.28.14:00 | Registrant A | None | |
| 2 | 2006.12.28.14:01 | Registrant B | None | Judge relevancy between registrants A and B to be "Level 2" |
| 3 | 2006.12.28.14:05 | Non-registrant X | None | Judge relevancies between registrants B and C and between registrant B and non-registrant X to be "Level 1" |
| 3 | 2006.12.28.14:05 | Registrant C | Group A | Judge relevancy between registrant B and non-registrant X to be "Level 3" |
| 4 | 2006.12.28.17:10 | Registrant D | None | Judge relevancy between registrants D and E to be "Level 3" |
| 4 | 2006.12.28.17:10 | Registrant E | Group B | (Not associated with history number 3) |

FIG. 24

| Person | Registrant A | Registrant B | Registrant C | Registrant D | Registrant E |
|---|---|---|---|---|---|
| Group | None | None | Group A | None | Group B |
| Non-registrant X | | 1 | | | |
| Registrant A | | 2 | | | |
| Registrant B | 2 | | 1 | | |
| Registrant C | | 1 | | | |
| Registrant D | | | | | 3 |
| Registrant E | | | | 3 | |

FIG. 25

| Identification information | Feature information of face | Group Number | | | | | |
|---|---|---|---|---|---|---|---|
| | | Group information | 1 | 2 | 3 | 4 | ... | N |
| | | Authenticated | Important customer | President family | Group requiring caution | Guard | ... | — |
| Person A | Feature A | Face image A | ○ | — | — | — | ... | |
| Person B | Feature B | Face image B | ○ | | | | ... | |
| Person C | Feature C | Face image C | ○ | ○ | | | ... | |
| Person D | Feature D | Face image D | | ○ | | | ... | |
| Person E | Feature E | Face image E | | | ○ | | ... | |
| Person F | Feature F | Face image F | | | ○ | | | |
| Person G | Feature G | Face image G | | | | ○ | | |
| Person H | Feature H | Face image H | | | | ○ | | |

(Group number, group information)

F I G. 26

| | Important customer (security level: 2) | | President family (security level: 1) | | Group requiring caution (security level: 5) | |
|---|---|---|---|---|---|---|
| | Person A | Person B | Person C | Person D | Person E | Person F |
| Person A | — | 3 | 0 | 1 | 0 | 0 |
| Person B | 3 | — | 0 | 0 | 0 | 0 |
| Person C | 0 | 0 | — | 0 | 0 | 0 |
| Person D | 1 | 0 | 0 | — | 0 | 1 |
| Person E | 0 | 0 | 0 | 1 | — | 0 |
| Person F | 0 | 0 | 0 | 0 | 0 | — |
| ... | ... | ... | ... | ... | ... | ... |
| Non-registrant A | 0 | 0 | 0 | 0 | 12 | 0 |
| Non-registrant B | 0 | 0 | 0 | 0 | 0 | 1 |

FIG. 29

BIOMETRIC DETERMINATION OF GROUP MEMBERSHIP OF RECOGNIZED INDIVIDUALS

CROSS-REFERENCE TO RELATED APPLICATIONS

This application is based upon and claims the benefit of priority from prior Japanese Patent Application No. 2006-038266, filed Feb. 15, 2006, the entire contents of which are incorporated herein by reference.

BACKGROUND OF THE INVENTION

1. Field of the Invention

The present invention relates to a person identification device and a person identification method in which biometric information of some of a face, retinas, mouth, irises, fingerprints, palm patterns, ears and the like of a person, and vein geometry of a part of a human body is obtained to collate the information with at least one or more pieces of beforehand registered biometric information.

2. Description of the Related Art

Heretofore, for example, in a person identification device, biometric information of some of a face, retinas, mouth, irises, fingerprints, palm patterns and ears and the like of a person to be identified, and vein geometry of a part of a human body is obtained, and the obtained information is collated with at least one or more pieces of beforehand registered biometric information to thereby judge whether or not the person to be identified is a beforehand registered person (a registrant). In an access control system which controls an access to a security area or an access to a specific apparatus, or in a monitoring system which monitors people, a device has been developed which executes control in accordance with a judgment result obtained by the person identification device. Various application examples of a person identification method for use in the person identification device include a method of collating biometric information obtained from a person to be identified who stands still with beforehand registered biometric information, and a method of collating biometric information obtained from a person to be identified who is moving, for example, walking with beforehand registered biometric information.

For example, in a passer-by identification device which collates biometric information obtained from a person (a passer-by) to be identified who goes along a passageway or the like with beforehand registered biometric information, identification processing can be executed even while the person to be identified is not especially aware of the identification processing being performed. Such a passer-by identification device for identifying the passer-by also covers a case where a plurality of continuously walking passers-by are identified. In such a case, in a conventional person identification device, even the plurality of continuously walking people are individually subjected to the identification processing one by one. In addition, Jpn. Pat. No. 3617373 (Document 1) describes a technology in which the number of the continuously walking people is measured to prevent missing of people.

BRIEF SUMMARY OF THE INVENTION

According to one aspect of the present invention, an object is to provide a person identification device and a person identification method in which a group of a plurality of people can efficiently be identified and which has high convenience.

A person identification device according to one aspect of the present invention comprises a storage unit in which at least one piece of biometric information of a registrant and group information indicating a group of registrants are associated with each other and stored, an information obtaining unit which obtains information including biometric information of the person, a detection unit which detects the biometric information of at least one person from the information obtained by the information obtaining unit, an identification unit which collates each biometric information detected by the detection unit with each biometric information stored in the storage unit to thereby identify the person having the biometric information detected by the detection unit, a group judgment unit which classifies a plurality of persons successively identified by the identification unit into group candidates based on predetermined conditions and which divides the persons of the group candidates into groups based on the group information of each person stored in the storage unit, and an output unit which outputs a grouping result obtained by this group judgment unit to an external device.

A person identification device according to one aspect of the present invention comprises a storage unit in which at least one piece of biometric information of a registrant and group information indicating a group of registrants are associated with each other and stored, an information obtaining unit which successively obtains information including biometric information of the person who is present in each monitoring area every plurality of monitoring areas of one area, a detection unit which detects the biometric information of at least one person from each information obtained by the information obtaining unit, an identification unit which collates each biometric information detected by the detection unit with each biometric information stored in the storage unit to thereby identify the person having the biometric information detected by the detection unit, a group judgment unit which judges whether or not a plurality of persons in the area perform a group action based on the information of each monitoring area obtained by the information obtaining unit and an identification result obtained by the identification unit from the biometric information detected from the information of the monitoring area by the detection unit, and an output unit which outputs a judgment result obtained by this group judgment unit to an external device.

A person identification method of identifying a person according to one aspect of the present invention comprises obtaining information including biometric information of the person, detecting the biometric information of at least one person from the obtained information, collating each detected biometric information with the biometric information of at least one registrant associated with group information and stored in a storage unit to thereby identify the person having the biometric information detected from the obtained information, classifying a plurality of successively identified persons into group candidates based on predetermined conditions, dividing the persons of the group candidates into groups based on the group information of each person stored in the storage unit, and outputting a grouping result to an external device.

A person identification method of identifying a person according to one aspect of the present invention comprises successively obtaining information including biometric information of the person who is present in each monitoring area every plurality of monitoring areas of one area, detecting the biometric information of at least one person from each obtained information, collating each detected biometric information with the biometric information of at least one registrant associated with group information and stored in a storage unit to thereby identify the person having each biometric information detected from the obtained information, judging whether or not a plurality of persons in the area perform a group action based on the obtained information of each monitoring area and an identification result obtained from the biometric information detected from the information of the monitoring area, and outputting a judgment result of the group action to an external device.

BRIEF DESCRIPTION OF THE SEVERAL VIEWS OF THE DRAWING

FIG. 3 is a diagram showing examples of registered information;

FIG. 4 is a diagram showing an example of a result of group identification processing;

FIG. 7 is a diagram showing examples of registered information;

FIG. 8 is a diagram showing examples of results of group identification processing;

FIG. 11 is a diagram showing processing examples of a relevancy judgment unit;

FIG. 12 is a diagram showing an example of a correlation map prepared by the relevancy judgment unit;

FIG. 15 is a diagram showing an example of group control information;

FIG. 16 is a diagram showing setting examples of a security area and a plurality of monitoring areas;

FIG. 18 is a diagram showing examples of access degrees stored in an access map;

FIG. 20 is a diagram showing setting examples of importance degrees with respect to monitoring areas;

FIG. 24 is a diagram showing examples of history information of identification results obtained by passer-by identification devices;

FIG. 25 is a diagram showing evaluation examples of relevancies based on the history information of the identification results;

FIG. 26 is a diagram showing examples of registered information in a passer-by identification system according to a seventh embodiment;

FIG. 29 is a diagram showing examples of access degrees stored in an access map.

DETAILED DESCRIPTION OF THE INVENTION

Embodiments according to the present invention will hereinafter be described with reference to the drawings.

In the following embodiments, a person identification device will be described. In the person identification device, facial feature information obtained from an image (biometric information) of a face of a person to be identified is collated with at least one or more pieces of beforehand registered facial feature information to thereby identify the person to be identified. The person identification device hereinafter described in each embodiment is applicable to a method of identifying the person in accordance with various biometric information other than the face. To the person identification device, there can be applied, for example, a method of identifying a person in accordance with biometric information of some of retinas, a mouth, irises, fingerprints, palm patterns, ears and vein geometry of a part (a hand, a finger or the like) of the person.

Moreover, in each embodiment, a passer-by identification device as the person identification device which identifies a person (a passer-by) who passes a specified place will be described. It is presumed that the passer-by identification device of each embodiment is applied to an access control system which controls an access of the person to an area (a security area) where an only specific person is permitted to access, an area control system which controls an access to a specific apparatus or the like, a person monitoring system for an observer to monitor the persons who pass the specific place, or a monitoring image recording system in which a monitoring image is stored in a storage device based on specific conditions and the like.

It is to be noted that the passer-by identification device of each embodiment is assumed to be especially applied to a system which performs access control, monitoring of the persons and the like in a place where there are very many passers-by as the persons to be identified. For example, it is assumed that the passer-by identification device of each embodiment is applied to an access control system which controls a passer-by who accesses an entrance of a building or a building of a company or a person monitoring system in a place such as a commercial facility, an amusement facility or a transportation accessed by many passers-by.

First, a first embodiment will be described.

Figure 1:
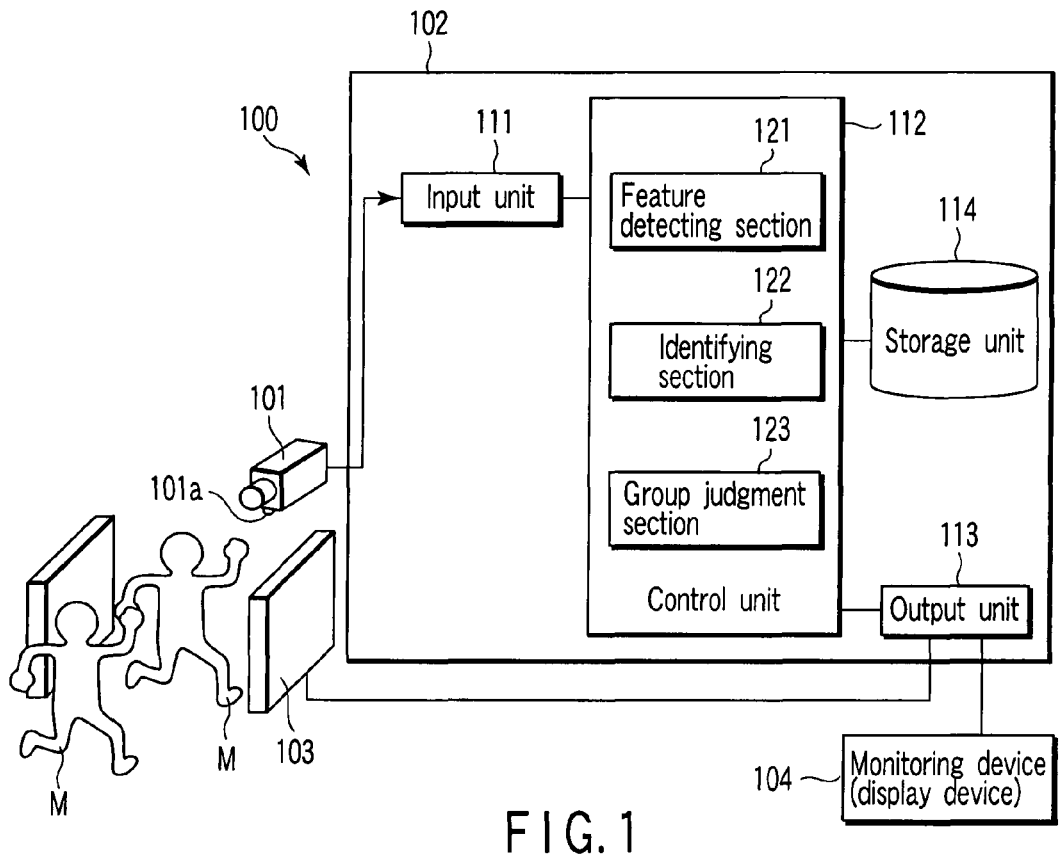
FIG. 1 is a block diagram schematically showing a constitutional example of a passer-by identification system according to a first embodiment.

FIG. 1 schematically shows a constitutional example of a passer-by identification system 100 including a passer-by identification device 102 as a person identification device according to the first embodiment. It is to be noted that FIG. 1 shows the constitutional example of a case where the passer-by identification system 100 is applied as an access control system which controls passage (access) to a gate and a person monitoring system.

As shown in FIG. 1, the passer-by identification system 100 is constituted of a camera 101, the passer-by identification device 102, a gate device 103, a monitoring device 104 and the like.

The camera 101 is a device which obtains information (an image) including a face image as biometric information. The camera 101 photographs an image of the specific place (an area to be monitored). The camera 101 is configured to photograph the face image (an image including at least a face) of a passer-by M who is going to pass the gate device 103. The camera 101 is a camera which photographs a dynamic image (a continuous image having a predetermined frame rate). The camera 101 is constituted of, for example, a television camera or the like including an image pickup element such as a CCD sensor. The camera 101 supplies the photographed image to the passer-by identification device 102. It is to be noted that as a device which obtains information including the biometric information, instead of the camera, an information input device such as a scanner may be used.

Moreover, as auxiliary means for detecting the passer-by, a sensor 101a which detects the person may be installed in the vicinity of the camera 101, depending on an operating configuration of the passer-by identification system 100. Examples of the sensor 101a to be installed in the vicinity of the camera 101 include a distance sensor which detects a distance from the person being photographed by the camera 101 to the camera 101 and a speed meter which measures a movement speed of the person being photographed by the camera 101. The information detected by the above sensor may be supplied as auxiliary information on the image photographed by the camera 101 to the passer-by identification device 102.

The passer-by identification device 102 identifies the person of the face image detected from the image photographed by the camera 101. The passer-by identification device 102 outputs an identification result of the person to the gate device 103. The passer-by identification device 102 obtains (inputs) the image photographed by the camera 101, extracts facial feature information from the input image, and collates the extracted facial feature information with facial feature information of a registrant beforehand stored (registered) in the storage device. The passer-by identification device 102 successively performs group judgment with respect to the person identified based on the collation result and predetermined conditions with respect to the image input from the camera 101. The passer-by identification device 102 outputs the above collation result and a result of the group judgment to the gate device 103 and the monitoring device 104.

The gate device 103 and the monitoring device 104 are external devices which operate in response to an output of a processing result obtained by the passer-by identification device 102 and the like. The gate device 103 or the monitoring device 104 is installed in accordance with the operating configuration of the system. The gate device 103 or the monitoring device 104 may be omitted depending on the operating configuration of the system.

The gate device 103 is a device which controls the passage of the person (the passer-by). The gate device 103 is constituted of, for example, a gate (not shown), a control mechanism (not shown) which controls opening/closing of the gate, an interface (not shown) for performing data communication with the passer-by identification device 102 and the like. In the constitutional example shown in FIG. 1, the gate device 103 controls the opening/closing of the gate (not shown) to thereby control the passage (the access) of the passer-by. That is, in a case where the passer-by identification system is operated as the access control system which controls the passage through the gate, the gate device 103 operates so as to control the passage of the passer-by in accordance with the processing result (the identification result with respect to the passer-by) obtained by the passer-by identification device 102.

The monitoring device 104 is a device for the observer to monitor a predetermined area. The monitoring device 104 has a constitution for informing the observer of information. For example, the monitoring device 104 is constituted of a display unit (not shown) which displays the information, a warning unit (not shown) which issues a warning, an operation unit (not shown) for the observer to input an operating instruction, an interface (not shown) for performing the data communication with the passer-by identification device 102 and the like. In the constitutional example shown in FIG. 1, the monitoring device 104 monitors the person (the passer-by) in an area (an area in the vicinity of the gate device 103) being photographed by the camera 101. That is, in a case where the passer-by identification system is operated as a monitoring system which monitors the person in the predetermined area, the monitoring device 104 operates so as to inform the observer of information such as the processing result (the identification result with respect to the passer-by) obtained by the passer-by identification device 102 (display, warning by voice or the like).

Next, a constitutional example of the passer-by identification device 102 will be described.

Moreover, the passer-by identification device 102 is constituted of an input unit (an image input unit) 111, a control unit 112, an output unit 113, a storage unit 114 and the like. Furthermore, the control unit 112 has a feature detecting section 121, an identifying section 122, a group judgment section 123 and the like.

The input unit 111 is an interface for inputting information such as the image. The input unit 111 also has a function of subjecting the input image information to image processing. That is, the input unit 111 takes in the image information (the image photographed by the camera 101) supplied from the camera 101. The input unit 111 subjects the image information obtained by the camera 101 to predetermined image processing, and supplies the image information subjected to the predetermined image processing to the control unit 112. For example, when the image information obtained from the camera 101 is an analog signal, the input unit 111 A/D converts the taken image information to thereby supply the digitized image information to the control unit 112. The input unit 111 may store the image information subjected to the predetermined image processing in a buffer memory (not shown) in a state readable from the control unit 112.

The control unit 112 is constituted of a calculation processor (not shown) such as a CPU, internal memories (not shown) such as a working memory, a program memory and a data memory, an internal interface (not shown) for inputting/outputting data with respect to the units and the like. In the control unit 112, the calculation processor executes various programs stored in the program memory and the like to realize various functions. As such functions, the control unit 112 has functions of the feature detecting section 121, the identifying section 122, the group judgment section 123 and the like as shown in FIG. 1.

The feature detecting section 121 performs processing to detect the facial feature information (the biometric information) from the image information taken from the camera 101 by the input unit 111. The feature detecting section 121 executes processing (face detection processing) to detect the image of a facial region from the input image taken from the input unit 111 and processing (feature extraction processing) to extract the facial feature information from the image of the facial region detected by the face detection processing.

The identifying section 122 performs person identification processing to judge whether or not the person photographed by the camera 101 is the person (the registrant) whose facial feature information (the biometric information) is stored in the storage unit 114. That is, the identifying section 122 performs collation processing to collate the facial feature information detected by the feature detecting section 121 with the facial feature information stored in the storage unit 114, and judgment processing to judge whether or not the facial feature information detected by the feature detecting section 121 agrees with any facial feature information stored in the storage unit 114 based on a collation result obtained by the collation processing.

The group judgment section 123 performs processing to determine a group with respect to the person identified by the identifying section 122. That is, the group judgment section 123 divides the persons identified by the identifying section 122 into group candidates, and determines the group with respect to each person of the group candidate.

It is to be noted that processing performed in the feature detecting section 121, the identifying section 122 and the group judgment section 123 will be described later in detail.

The storage unit 114 stores information on the registrant. In the storage unit 114, the facial feature information (or the face image) as the biometric information of each registrant is associated with group information indicating the group to which each registrant belongs, and stored. In the first embodiment, it is assumed that the above information is beforehand stored in the storage unit 114. The information stored in the storage unit 114 will be described later in detail.

The output unit 113 outputs information such as a control signal or display data to the gate device 103 or the monitoring device 104 (the external device) based on the identification result obtained by the identifying section 122, a group judgment result of the group judgment section 123 and the like. For example, the output unit 113 outputs, to the gate device 103, the control signal indicating whether or not the passage is possible (whether the gate is opened or closed) with respect to each passer-by in accordance with the identification result obtained by the identifying section 122, the judgment result obtained by the group judgment section 123 and the like. The output unit 113 outputs, to the monitoring device 104, information (data such as the image or voice) such as the identification result obtained by the identifying section 122 and the result of the group judgment performed by the group judgment section 123. In this case, the output unit 113 may output the image information photographed by the camera 101 together with the above information.

Next, the feature detecting section 121 will be described in detail.

The feature detecting section 121 performs face detection processing to detect the image of the facial region from the input image and the feature extraction processing to extract the facial feature information from the image of the facial region.

First, the above face detection processing in the feature detecting section 121 will be described in detail.

In the face detection processing, first the region of the face is detected from the image (the image photographed by the camera 101) input by the input unit 111. As a technique to detect the region of the face, for example, a correlation value is obtained while a beforehand prepared template is moved in the image, and a region which gives the highest correlation value is regarded as the facial region. It is to be noted that as a technique to detect the region of the face, an inherent space technique or an extraction method of the facial region utilizing a subspace technique may be used.

In the face detection processing, next a position of a specific portion such as eyes, a nose and a mouth of the face is detected from the image of the detected facial region. As a detection method of the specific portion, it is possible to use a method disclosed in, for example, Document [2] (Kazuhiro FUKUI, Osamu YAMAGUCHI: "Facial Feature Point Extraction by Combination of Geometry Extraction and Pattern Collation", Journal of the Institute of Electronics, Information and Communication Engineers (D), vol. J80-D-II, No. 8, pp. 2170 to 2177 (1997)) or the like.

It is to be noted that in the person identification device which identifies the person by use of the biometric information obtained from the image of the specific portion of the face instead of the whole face, it is possible to perform processing to zoom up an image of a desired portion detected by the face detection processing and extract the biometric information from the zoomed-up image. This can be realized by controlling the camera 101 so as to zoom up the position of the desired portion detected by the face detection processing. In this case, the camera 101 photographs the image obtained by zooming up the position of the desired portion, and supplies the image to the person identification device. For example, in the person identification device which identifies the person by use of the biometric information obtained from the image of an eye such as an iris or a retina, a region of the eye detected by the face detection processing is zoomed up, and an image of the zoomed-up region of the eye can be obtained.

Moreover, in addition to the detection of the eye and the nose, a mouth region can be detected using a technology of, for example, Document [3] (Mayumi YUASA, Yoshiko NAKAJIMA: "Digital Make System based on High-Precision Facial Feature Point Detection" the 101-st Image Sensing Symposium Digests, pp. 219 to 224 (2004)).

Furthermore, a fingerprint or vein pattern can be detected using a common method for a pattern matching.

According to any of the above techniques, it is possible to obtain the image information of a two-dimensional array and detect the biometric information from the image information.

Moreover, according to the above processing, to extract an only image (the biometric information) of one facial region from one image, the correlation value between the whole image and the template is obtained, and a position and a size of one region having the maximum correlation value may be judged to be one facial region. On the other hand, to extract images (the biometric information) of a plurality of facial regions from one image, a plurality of local maximum values of the correlation value with respect to the whole image are obtained, and the candidates of the facial regions are narrowed down in consideration of overlaps of the regions having the local maximum correlation values with another region. Furthermore, in a case where a continuous image (the dynamic image) is obtained as an input image, when a relation (transition with time) between the image and the previous input image is also considered, it is possible to narrow down the candidates of the plurality of facial regions.

Figure 2:
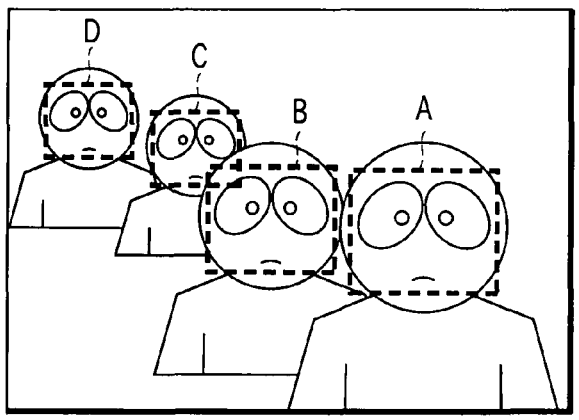
FIG. 2 is a diagram showing an example of a facial region detected from an input image.

FIG. 2 is a diagram showing an example of an image in which there are a plurality of facial regions. When one image shown in FIG. 2 is input, in the face detection processing, a plurality of regions A to D shown by broken lines in FIG. 2 are detected as the facial regions of the input image. That is, in the system constitution shown in FIG. 1, when a plurality of passers-by simultaneously walk to the gate device 103, the camera 101 simultaneously photographs the passers-by in one image. For example, when four passers-by are simultaneously present in a photographing region, the camera 101 photographs the image shown in FIG. 2. In this case, the face detection processing detects the regions A to D as the facial regions of the passers-by.

Next, the feature extraction processing performed in the feature detecting section 121 will be described in detail.

The feature extraction processing performed in the feature detecting section 121 is processing to extract the facial feature information (a feature amount) from the image of the facial region detected by the face detection processing. The feature extraction processing, for example, converts the image of the facial region into a predetermined shape (e.g., an image of m pixels×n pixels) having a predetermined size based on the image of the facial region and the position of the specific portion detected by the face detection processing, and obtains gradation information of the pixels in the image of the facial region as the facial feature information (the feature amount). The facial feature information having a gradation value of each pixel in the image of the facial region of m pixels×n pixels is represented by a feature vector including m×n-dimensional information. A similarity degree between the feature vector as the above facial feature information and another feature vector is calculated by, for example, a technique referred to as a simple similarity degree technique. In the simple similarity degree technique, lengths of the vectors are normalized so as to be set to "1", respectively, and an inner product of the normalized vectors is calculated. In consequence, the similarity degree indicating similarity between two vectors is obtained.

When the identification processing is performed with one image, the facial feature information of the person is extracted as the feature vector from one image by the above technique. On the other hand, when the identification processing is performed with a plurality of continuous images (the dynamic image), a technique referred to as the subspace technique to generate the facial feature information from the plurality of continuous images is applicable. In a subspace method, first, the feature vector including the gradation value in the image of the facial region of m×n pixels is generated with respect to the plurality of continuous input images by techniques similar to the above techniques. When a plurality of feature vectors are obtained from the plurality of continuous input images, a correlation matrix (or a covariance matrix) of these feature vectors is obtained in the subspace technique. When the correlation matrix is obtained, well-known KL expansion is performed with respect to the correlation matrix to thereby obtain an orthonormal vector (an inherent vector) in the subspace technique.

A subspace as the facial feature information obtained from the continuous images is calculated from the orthonormal vector obtained as described above. The subspace is represented by a set of k inherent vectors selected from a larger inherent value. The subspace is calculated as a matrix $\Phi$ of the inherent vectors by the following equation 1 by use of a correlation matrix Cd calculated from the plurality of feature vectors obtained from the plurality of input images:

$$Cd=\Phi d Ad \Phi dT \qquad \text{(Equation 1)}.$$

The above subspace is the facial feature information of the person to be identified. For example, when a plurality of facial regions (the facial regions of four passers-by) A to D are detected as in the example shown in FIG. 2, the above feature extraction processing is repeatedly executed with respect to the facial regions A to D. In consequence, four subspaces A to D are calculated as the facial feature information of four passers-by. It is to be noted that in the storage unit 114, the subspace calculated by the above technique may be registered as the facial feature information of the registrant.

Next, registered information to be stored in the storage unit 114 will be described in detail.

In the storage unit 114, information on the registrant (e.g., a person permitted to pass through a gate) to be collated with the input image (the facial feature information obtained from the input image) is stored. In the storage unit 114, as the information on the registrant, the facial feature information of the registrant obtained from an image (a face image for registration) including the registrant's face and the like are beforehand stored.

FIG. 3 is a diagram showing examples of the information (the registration information) on the registrants stored in the storage unit 114. In the example shown in FIG. 3, identifying information, the facial feature information, the face image, the group information and the like on each registrant are stored in the storage unit 114.

The identifying information is information for identifying the registrant. For example, the above identifying information is a registrant's name, ID information given to the registrant and the like. The facial feature information is information (the feature information of the registrant's face) to be collated with the facial feature information obtained from the input image. The facial feature information is information generated from the face image for registration by a technique for use in the above feature extraction processing. The face image is an image (the whole image for registration or the image of the facial region detected from the image for registration) including the registrant's face for registration.

It is to be noted that in the storage unit 114, as the facial feature information, the subspace generated from a plurality of continuous face images for registration may be stored, the feature vector generated from the face images for registration may be stored, the face image (the image of the facial region detected from the input image) before the feature extraction processing is executed may be stored, or the correlation matrix before the KL expansion is performed may be stored. Here, it is assumed that the subspace obtained from a plurality of continuous images is registered as the feature information of the registrant's face in the storage unit 114.

Moreover, in the storage unit 114, the feature information of one face may be stored with respect to one registrant, or the feature information of a plurality of faces may be stored with respect to one registrant. When the feature information of the plurality of faces is stored with respect to one registrant, the identifying section 122 may collate all the feature information of the registrant with the facial feature information obtained from the input image with respect to each registrant, or may collate the facial feature information selected based on photographing conditions of the input image and the like with the facial feature information obtained from the input image.

The group information is information indicating the group to which the registrant belongs. In the storage unit 114, information indicating the group to which each registrant belongs is associated with each registrant and stored. Furthermore, in each group, information such as an importance degree, a warning degree (a degree of caution needed) and necessity of assistance (whether or not the assistance is needed) indicating a feature of the group is associated with a group number or the like and stored. In the example shown in FIG. 3, as the information indicating the feature of the group, information such as a group of "important customers" (group number 1), a group of "president family" (group number 2) and a group of "group requiring caution" (group number 3) is stored.

Next, the identifying section 122 will be described in detail.

The identifying section 122 judges whether or not the person of the face image included in the image photographed by the camera 101 is any registrant stored in the storage unit 114. The identifying section 122 calculates the similarity degree between the facial feature information obtained from the input image photographed by the camera 101 and the facial feature information of each registrant stored in the storage unit 114. When the similarity degree between the facial feature information and each registrant's facial feature information is calculated, the identifying section 122 determines, based on each calculated similarity degree, the registrant which agrees with the person of the face image included in the input image. For example, when the maximum similarity degree is not less than a predetermined value, the identifying section 122 judges that the person of the face image included in the input image is the registrant having the maximum similarity degree (identifies the person of the face image included in the input image as the registrant having the maximum similarity degree). When the maximum similarity degree is less than the predetermined value, the identifying section 122 judges that the facial feature information detected from the input image does not agree with any registrant's facial feature information (judges that the person of the face image included in the input image is not the registrant).

As a method of calculating the similarity degree between the facial feature information, a technique such as a mutual subspace technique or a composite similarity degree technique is applicable. For example, the mutual subspace technique is described in Document [4] (Kenichi MAEDA, Sadaichi WATANABE: "Pattern Matching Technique with introduced Local Structure", the Institute of Electronics, Information and Communication Engineers (D), vol. J68-D, No. 3, pp. 345 to 352 (1985)). This mutual subspace technique is a technique for calculating the similarity degree between the subspaces. In the above mutual subspace technique, an "angle" formed by two subspaces is defined as the similarity degree. Therefore, when the identifying section 122 calculates the similarity degree by the above mutual subspace technique, the subspaces are used in both of the registrant's facial feature information stored in the storage unit 114 and the facial feature information obtained from the input image (the plurality of continuous images) input from the camera 101. Here, it is assumed that the subspace obtained from the input image is referred to as the input subspace. The subspace as the registrant's facial feature information stored in the storage unit 114 is referred to as the dictionary subspace.

A relational equation represented by the following equation 2 is established between a correlation matrix Cin obtained from the plurality of continuous input images and an inherent vector Φin. Therefore, an input subspace Φ(in is calculated by the relational equation between the correlation matrix Cin and the inherent vector Φin represented by the following equation 2:

$$Cin = \Phi in A in \Phi in T \quad \text{(Equation 2)}.$$

Therefore, the similarity degree between the person of the face image included in the input image (the facial feature information obtained from an input image unit) and the registrant (the registrant's facial feature information) is calculated as the similarity degree (0 to 1) between the input subspace Φin and a dictionary subspace Φd.

Moreover, in a case where the face images of a plurality of persons are present in each input image (one frame of image), the identifying section 122 calculates the similarity degree between the facial feature information obtained from each face image and each registrant's facial feature information stored in the storage unit 114. That is, the identifying section 122 roundly calculates the similarity degree between the feature information of a plurality of faces obtained from a plurality of face images included in the input image and each registrant's facial feature information stored in the storage unit 114. In consequence, the identifying section 122 can obtain identification results of the face images of all the persons included in the input image and the face image of the registrant. For example, in a case where the camera 101 photographs X persons' faces, when the registration information of Y registrants is present, the identifying section 122 performs calculation processing of the similarity degree X×Y times. In consequence, the identifying section 122 can obtain the identification results of all the X persons.

Moreover, in a case where the input subspaces obtained from m input images do not agree with any registrant's dictionary subspace, the identifying section 122 may execute the identification processing (the calculation processing of the similarity degree) again with the input subspace updated by the next obtained input image (an m+1-st frame image). In this case, the input subspace can be updated by adding the feature vector obtained from the obtained input image to a sum of the correlation matrixes prepared from a plurality of previous frames, and calculating the inherent vector again.

That is, when the camera 101 continuously photographs the images (in a case where the camera 101 continuously photographs the face images of the passers-by), the passer-by identification device 102 can execute authentication processing while updating the input subspace with the image successively obtained from the camera 101. In this case, since the number of the input images constituting the input subspace gradually increases, it can be expected that precision gradually increases.

Next, the group judgment section 123 will be described in detail.

The group judgment section 123 performs group judgment processing (combination judgment processing) to determine the group with respect to a plurality of persons identified by the identifying section 122. The group judgment section 123 determines the group candidates obtained by dividing the plurality of persons identified by the identifying section 122 into the groups in accordance with predetermined conditions. Furthermore, the group judgment section 123 determines the group (a group name, the number of persons, etc.) based on the group information of the persons (the registrants) of the group candidate.

To determine the group candidate, a plurality of persons are selected as the group candidate based on the predetermined conditions. For example, as the group candidate, the plurality of persons detected from one image (the plurality of persons simultaneously photographed by the camera 101) are selected as the group candidate, or the persons detected from the images photographed by the camera 101 within a predetermined time are selected as the group candidate. In an operating configuration in which a plurality of cameras 101 are installed at a plurality of places, the persons detected from the images photographed at the plurality of places in the same time zone may be judged to be the group candidate.

Moreover, the group is determined based on the group information of the persons (the registrants) judged to be the group candidate. That is, the group of the persons of the group candidate is finally determined in accordance with the group information. As a result of such group judgment, information such as the group and the number of the persons belonging to the group is obtained. The group judgment section 123 supplies the result of the above group judgment to the output unit 113.

FIG. 4 is a diagram showing examples of the result of the group judgment processing.

In the example shown in FIG. 4, it is indicated that three persons of Group 1 and two persons of Group 2 have been identified from the image photographed by the camera installed at Gate 1. For example, in a case where four face images detected from one image shown in FIG. 2 are identified as the face images of the persons (the registrants) A to D shown in FIG. 3, the group judgment processing judges that the persons A, B and C belong to Group 1 and that persons C and D belong to Group 2 with reference to FIG. 3. In this case, as the result of the group judgment, as shown in FIG. 4, the number of the persons of Group 1 is three, and the number of the persons of Group 2 is two.

It is to be noted that the result of the group judgment shown in FIG. 4 is an example of a case where it is judged that all the persons are registrants. If a person who is not a registrant registered in advance is going to pass the gate device 103, needless to say, the person is not identified as the registrant. In this case, the person who has not been identified as the registrant is counted up as a non-registrant. It is to be noted that the number of the persons which have been counted up as the non-registrants is output as the result of the group judgment from the output unit 113.

Moreover, the group judgment result shown in FIG. 4 is displayed in the monitoring device 104, the observer of the monitoring device 104 can quickly and easily recognize that three persons belonging to Group 1 and two persons belonging to Group 2 are photographed by the camera 101. As a result of this recognition, the observer can smoothly take an action with respect to the persons of each group. The observer can smoothly execute an appropriate action or the like in accordance with the number of the persons of each group.

Next, the output unit 113 will be described in detail.

The output unit 113 is an interface which outputs the processing result obtained by the passer-by identification device 102 to the outside. The information to be output from the output unit 113 to the outside can appropriately be set in accordance with the constitution or the operating configuration of the whole system. The output unit 113 can output, to the external device (the gate device 103 or the monitoring device 104), information such as the image photographed by the camera 101, the image of the facial region or the facial feature information obtained from the feature detecting section 121 and the result of the group judgment obtained by the group judgment section 123. For example, the output unit 113 outputs, to the gate device 103, the control signal instructing the opening/closing of the gate in accordance with the identification result of the identifying section 122. The output unit 113 outputs, to the monitoring device 104, information such as the image photographed by the camera 101, the image of the facial region or the facial feature information obtained from the feature detecting section 121 and the result of the group judgment obtained by the group judgment section 123 as the display data.

Next, a flow of the processing performed in the passer-by identification system 100 according to the first embodiment will be described.

Figure 5:
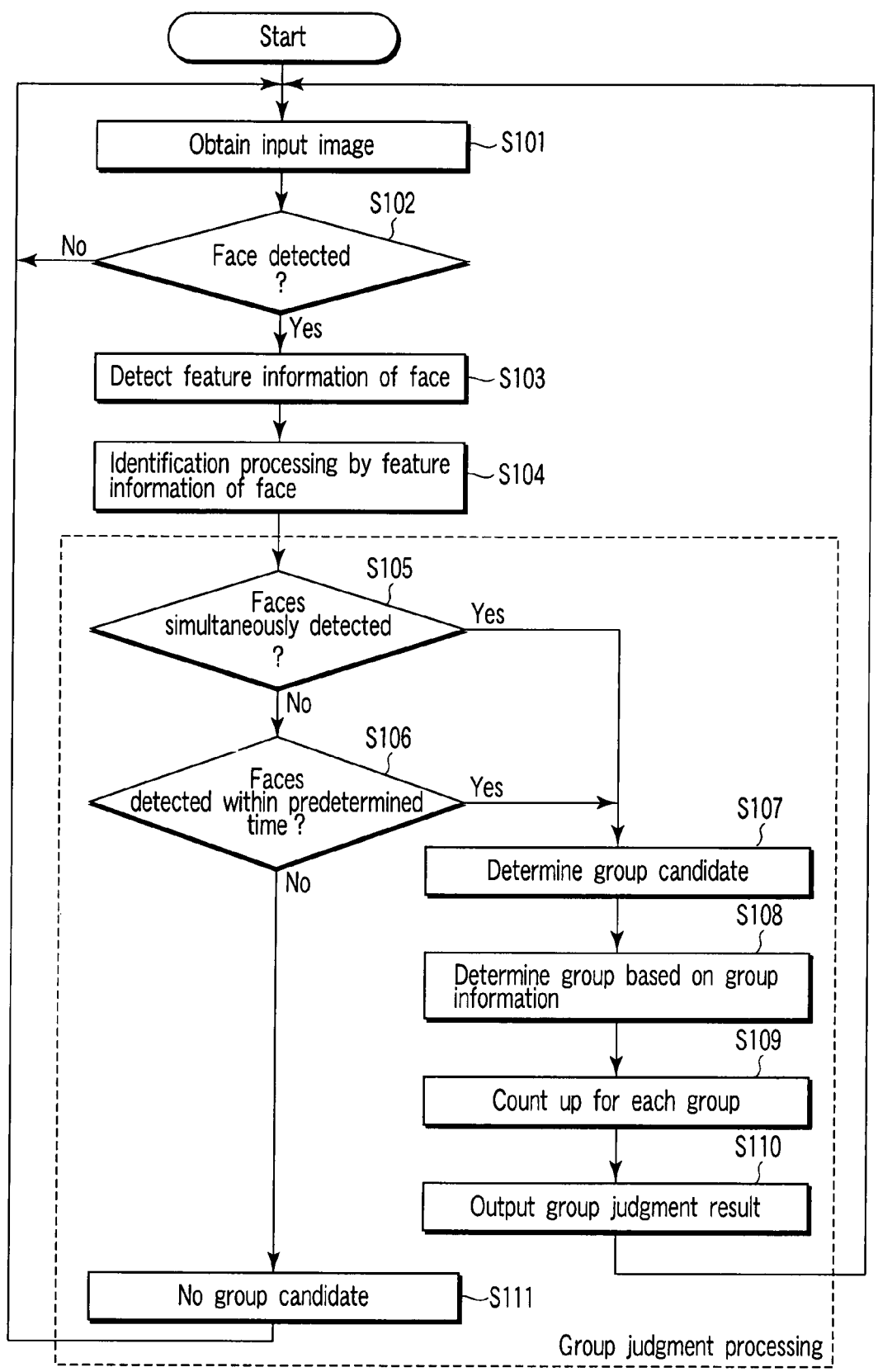
FIG. 5 is a flow chart for explaining a flow of processing in the passer-by identification system according to the first embodiment.

FIG. 5 is a flow chart for explaining the processing performed in the passer-by identification system 100 according to the first embodiment.

First, it is assumed that the camera 101 photographs an image of a predetermined photographing region. In the constitutional example shown in FIG. 1, the passage formed by the gate device 103 is photographed. The image photographed by the camera 101 is supplied to the input unit 111 of the passer-by identification device 102. The input unit 111 of the passer-by identification device 102 successively inputs the images photographed by the camera 101 as the input images (step S101). The control unit 112 of the passer-by identification device 102 allows the feature detecting section 121 to perform processing to detect the person's face from the input image (step S102). When the feature detecting section 121 detects the person's face from the input image, the feature detecting section 121 performs the face detection processing and the feature extraction processing to extract the facial feature information. In consequence, the feature detecting section 121 detects the person's facial feature information included in the input image (step S103).

Moreover, in a case where the input subspace is generated as the facial feature information, the feature detecting section 121 generates the input subspace from the successively input images. In a case where a plurality of persons' face images are included in one input image, the feature detecting section 121 detects the feature information of the faces from the face images of all the persons detected from the input image.

In a case where the feature detecting section 121 detects the facial feature information from the input image, the identifying section 122 judges whether or not the facial feature information detected from the input image agrees with any registrant's facial feature information stored in the storage unit 114. That is, the identifying section 122 performs the person identification processing to judge whether or not the person of the face image included in the input image is any registrant (step S104). In the identification processing performed by the identifying section 122, information indicating whether the person of the facial feature information detected from the input image is the registrant or the non-registrant is obtained as the identification result of the person. The result of the identification processing by the identifying section 122 is supplied not only to the output unit 113 but also to the group judgment section 123. It is to be noted that the output unit 113 outputs the control signal instructing the opening/closing of the gate to the gate device 103 or outputs the identification result together with the input image to the monitoring device 104 in response to the identification result.

It is assumed that the group judgment section 123 stores the identification result supplied from the identifying section 122 in an internal memory (not shown). It is to be noted that the result of the identification processing supplied to the group judgment section 123 includes information indicating the person identification result (whether the person is the registrant or the non-registrant) together with information such as a photographing time of the input image from which the person's face image has been detected.

The group judgment section 123 performs the group judgment with respect to the person identified by the identifying section 122. Here, it is assumed that the plurality of simultaneously photographed persons (the plurality of persons detected in one input image) or the persons photographed within the predetermined time are the group candidates. The identification results of the persons are successively supplied from the identifying section 122 to the group judgment section 123. When the identification result is supplied from the identifying section 122, the group judgment section 123 judges whether or not another person's face is detected from the input image from which the identification result has been obtained. That is, the group judgment section 123 judges whether or not the faces of the plurality of persons (the plurality of simultaneously photographed persons) are detected from one input image (step S105). Furthermore, the group judgment section 123 judges whether or not the faces of the plurality of persons are detected from the input image photographed within the predetermined time (step S106).

In a case where it is judged that the faces of the plurality of persons are detected from one input image or the input image photographed within the predetermined time (YES in the step S105 or YES in the step S106), the group judgment section 123 judges the persons to be the group candidates (step S107). In a case where the identified persons are judged to be the group candidates, the group judgment section 123 determines the group to which the persons belong based on the group information of the persons (step S108). When the group is determined, the group judgment section 123 counts up the number of the persons of each group among the group candidates (step S109). When the identified persons are counted up based on the group information, the group judgment section 123 outputs information indicating the number of the persons of each group among the group candidates as a result of the group judgment to the output unit 113 (step S110).

For example, when the four persons A, B, C and D shown in FIG. 3 are identified in order from one input screen shown in FIG. 2, the group judgment section 123 judges the four persons A, B, C and D to be the group candidates. Furthermore, the group judgment section 123 counts up the number of the persons of each person group every time the identification result of each person is obtained. That is, according to the registration information shown in FIG. 3, the group judgment section 123 counts up Group 1 in a case where the person A is identified, counts up Group 1 in a case where the person B is identified, counts up Groups 1 and 2 in a case where the person C is identified, and counts up Group 1 in a case where the person D is identified. As a result of such group judgment, information shown in FIG. 4 is obtained.

Moreover, in a case where it is judged that the faces of the plurality of persons have been detected from the input image photographed within the predetermined time (NO in the step S106), the group judgment section 123 judges that there is not any group candidate in the persons identified by the identifying section 122 (step S111). In this case, the passer-by identification device 102 returns to the step S101 to repeat the above processing.

In the first embodiment described above, the registrant's facial feature information is associated with the group information beforehand and stored in the storage unit, the facial feature information of the passer-by is detected from the image photographed by the camera 101, and the detected facial feature information of the passer-by is collated with the registrant's facial feature information stored in the storage unit to identify the passer-by. Furthermore, the identified passers-by are divided into the groups based on the group information of each registrant stored in the storage unit, and the result of the group dividing is output to the external device.

In consequence, according to the first embodiment, the passer-by identification device can notify an external device such as the monitoring device of "the group and the number of the persons of the group" appearing in the predetermined place (the region photographed by the camera). In consequence, the external device can inform the observer of "the group and the number of the persons of the group" appearing in the predetermined place. As a result, for example, when the group of the important customers appears, the observer can quickly make preparations for guests. When the group of the persons requiring caution, the observer can quickly take an action such as arrangement of guards by way of precaution or starting of recording of a monitoring image. Even when the group including the person requiring the caution is a registrant, it is possible to perform control such as the closing of the gate of the gate device.

Next, a second embodiment will be described.

Figure 6:
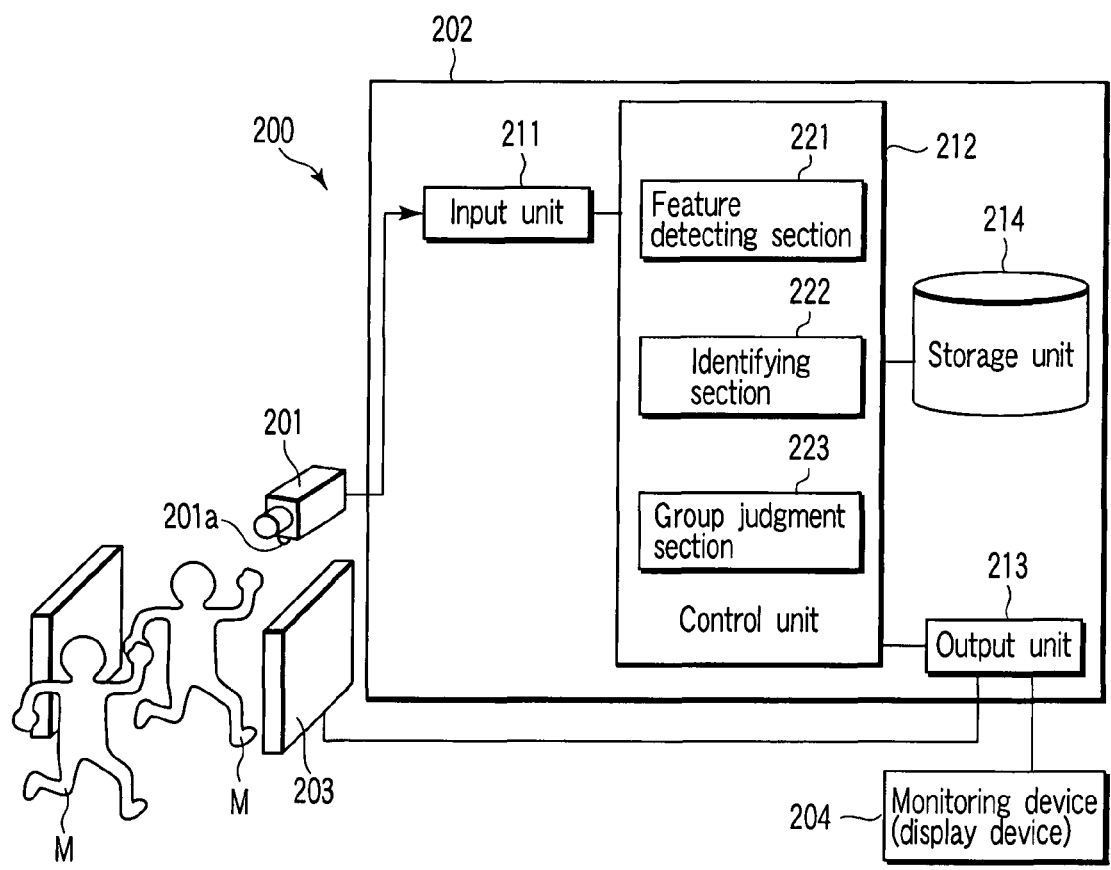
FIG. 6 is a block diagram schematically showing a constitutional example of a passer-by identification device according to a second embodiment.

FIG. 6 schematically shows a constitutional example of a passer-by identification system 200 including a passer-by identification device 202 as a person identification device according to the second embodiment.

As shown in FIG. 6, the passer-by identification system 200 is constituted of a camera 201, the passer-by identification device 202, a gate device 203, a monitoring device 204 and the like. Furthermore, the passer-by identification device 202 is constituted of an input unit (an image input unit) 211, a control unit 212, an output unit 213, a storage unit 214 and the like. Furthermore, the control unit 212 has a feature detecting section 221, an identifying section 222, a group judgment section 223 and the like.

It is to be noted that in the passer-by identification system 200 shown in FIG. 6, the camera 201, the gate device 203, the monitoring device 204, the input unit (the image input unit) 211, the output unit 213, the feature detecting section 221 and the identifying section 222 have constitutions substantially similar to those of the camera 101, the gate device 103, the monitoring device 104, the input unit (the image input unit) 111, the output unit 113, the feature detecting section 121 and the identifying section 122 in the passer-by identification system 100 shown in FIG. 1. Therefore, detailed description thereof is omitted.

The passer-by identification system 200 according to this second invention is different from the passer-by identification system 100 described in the first embodiment in information for dividing persons into groups. In the passer-by identification system 100 according to the first embodiment, it is assumed that as the information for dividing the persons into the groups, group information indicating a group name of each registrant and the like is registered. This group information is information for directly dividing the persons into the groups. Therefore, in the passer-by identification system 100, the registrants beforehand need to be divided into the groups and registered, and the information needs to be stored in the storage unit.

On the other hand, in the passer-by identification system 200 according to the second embodiment, it is assumed that as the information for dividing the persons into the groups, attribute information of each registrant is registered. Therefore, in the passer-by identification system 200, the group of the persons is determined based on the attribute information of each registrant. As the attribute information, various pieces of information can be registered. It is considered that examples of the attribute information include information such as age, gender, importance degree, precaution degree and necessity of assistance. When among such attribute information, information as an object of the group dividing is beforehand set, the passer-by identification device 202 outputs information obtained by dividing the persons into the groups in accordance with the set information as a result of group judgment. For example, when the age or the gender is beforehand set as the information for the group dividing, the passer-by identification device 202 outputs a result of the group judgment to divide the persons into the groups by the age or the gender. Alternatively, when the importance degree, the precaution degree or the necessity of assistance is beforehand set as the information for the group dividing, the passer-by identification device 202 outputs a result of the group judgment to divide the persons into the groups by the importance degree, the precaution degree or the necessity of assistance.

The units of the passer-by identification system 200 will hereinafter be described in detail.

First, in the storage unit 214, identifying information, facial feature information, a face image and the attribute information (the age, the gender, the importance degree, the precaution degree, the necessity of assistance, etc.) are stored as registration information for each registrant. The identifying information, the facial feature information and the face image are similar to the identifying information, the facial feature information and the face image information stored in the storage unit 114 described in the first embodiment. That is, the present embodiment is different in that instead of the group information stored in the storage unit 114 described in the first embodiment, the person attribute information is stored in the storage unit 214.

FIG. 7 is a diagram showing examples of the registration information for each registrant stored in the storage unit 214. In the example shown in FIG. 7, information such as the age, the gender, the importance degree, the precaution degree and the necessity of assistance is stored as the attribute information associated with information such as the identifying information, the facial feature information and the face image for each registrant.

The group judgment section 223 performs judgment of a group candidate and the group judgment in the same manner as in the group judgment section 123 described in the first embodiment. The group candidate is determined by processing similar to that of the group judgment section 123. In the group judgment performed in the group judgment section 223, the persons (the registrants) of the group candidates are divided into the groups based on predetermined information among the attribute information of the persons (the registrants), and the number of the persons of each divided group is counted up. In the group judgment section 223, it is assumed that as the information for the group dividing, specific information (one or a plurality of pieces of specific information) of the attribute information stored in the storage unit 214 is beforehand set. However, an operator may appropriately set the information for the group dividing, or an observer may appropriately set the information with an operating unit (not shown) of the monitoring device 204.

FIG. 8 is a diagram showing an example of a result of group judgment processing in the group judgment section 223.

In the example shown in FIG. 8, it is indicated that two important persons and one person requiring the assistance are identified from an image photographed by a camera installed at Gate 1. Here, assuming that the registration information shown in FIG. 7 is stored in the storage unit 214, a result of the group judgment shown in FIG. 8 is obtained in a case where persons B, C and D are detected as group candidates. This is because in the example shown in FIG. 7, the attribute information of the persons C and D indicates a high degree of importance, and the attribute information of the person B indicates the necessity of assistance.

Moreover, when the group judgment result shown in FIG. 8 is displayed in the monitoring device 204, the observer of the monitoring device 204 can easily recognize information indicating that two important persons and one person requiring the assistance have been photographed by the camera 201. As a result, the observer can smoothly take an appropriate action with respect to the important persons, and take an appropriate action such as preparation of a wheelchair or leading of the way with respect to the person requiring the assistance.

Next, a flow of processing in the passer-by identification system 200 according to the second embodiment will be described.

Figure 9:
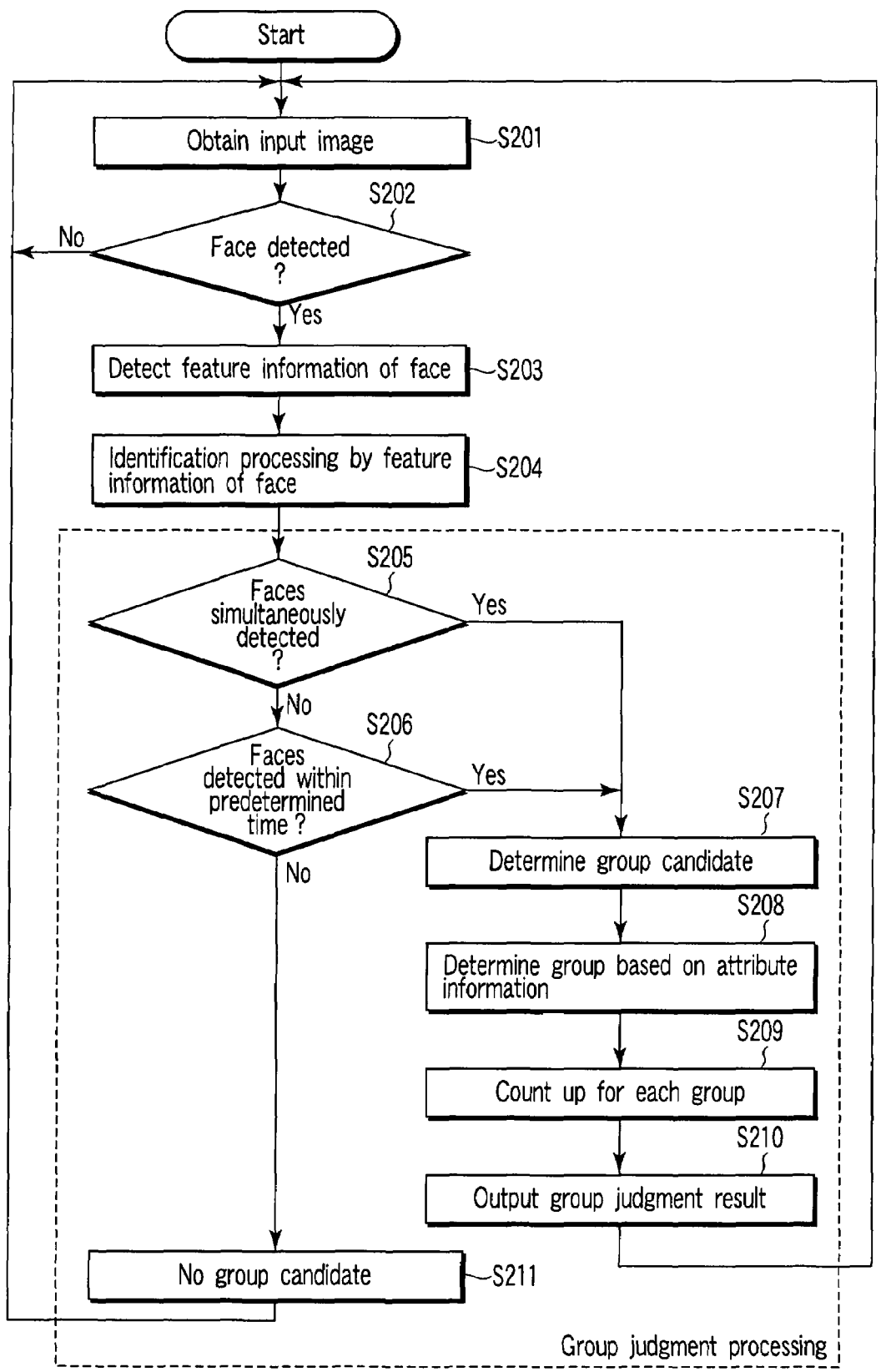
FIG. 9 is a flow chart for explaining a flow of processing in the passer-by identification system according to the second embodiment.

FIG. 9 is a flow chart for explaining processing in the passer-by identification system 200 according to the second embodiment.

It is to be noted that each processing of steps S201 to S207, S209 to S211 shown in FIG. 9 are similar to each processing of the steps S101 to S107, S109 to S111 shown in FIG. 5, and detailed description thereof is therefore omitted.

That is, when the person identified by the identifying section 222 is judged to be the group candidate in the passer-by identification device 202, the group judgment section 223 determines the group of the person based on the predetermined information for the group dividing in the attribute information of the person (step S208). When the group of each person is determined, the group judgment section 123 counts up the number of the persons of each group in the group candidates (step S209). It is to be noted that here, the number of the persons of each group is counted up for each group candidate. The group judgment section 123 outputs information indicating the number of the persons of each group in the group candidates as the result of the group judgment to the output unit 113 (step S210).

For example, when the three persons B, C and D shown in FIG. 7 are judged to be the group candidates, the group judgment section 123 divides the persons into the groups based on the attribute information of the persons, and counts up the number of the persons of each group. That is, according to the registration information shown in FIG. 7, the group judgment section 123 counts up the number of the persons requiring the assistance (the group requiring the assistance) in a case where the person B is identified, counts up the number of the important persons (the group of the important persons) in a case where the person C is identified, and counts up the number of the important persons (the group of the important persons) in a case where the person D is identified. As a result of such group judgment, the information shown in FIG. 8 is obtained.

In the above passer-by identification system according to the second embodiment, registrant's facial feature information is beforehand associated with various pieces of attribute information, and stored in the storage unit, the facial feature information of the passer-by is detected from the image photographed by the camera 101, and the detected facial feature information of the passer-by is collated with the registrant's facial feature information stored in the storage unit to thereby identify the passer-by. Furthermore, the identified passers-by are divided into the groups based on the attribute information of the persons stored in the storage unit, and the result of the group dividing is output to the external device.

In consequence, according to the second embodiment, the passer-by identification device can notify an external device such as the monitoring device of "a type and the number of the persons belonging to the group" appearing in a predetermined place (a region photographed by the camera). In consequence, the external device can inform the observer of "the type and the number of the persons belonging to the group" appearing in the predetermined place. As a result, for example, when the group of the important persons appears, the observer can quickly make preparations for guests. When the group of the persons requiring caution appears, the observer can quickly take an action such as arrangement of guards by way of precaution or starting of recording of a monitoring image. Even when the group including persons of specific attribute information such as the persons requiring the caution is a registrant, it is possible to perform control such as the closing of the gate of the gate device 203.

Next, a third embodiment will be described.

Figure 10:
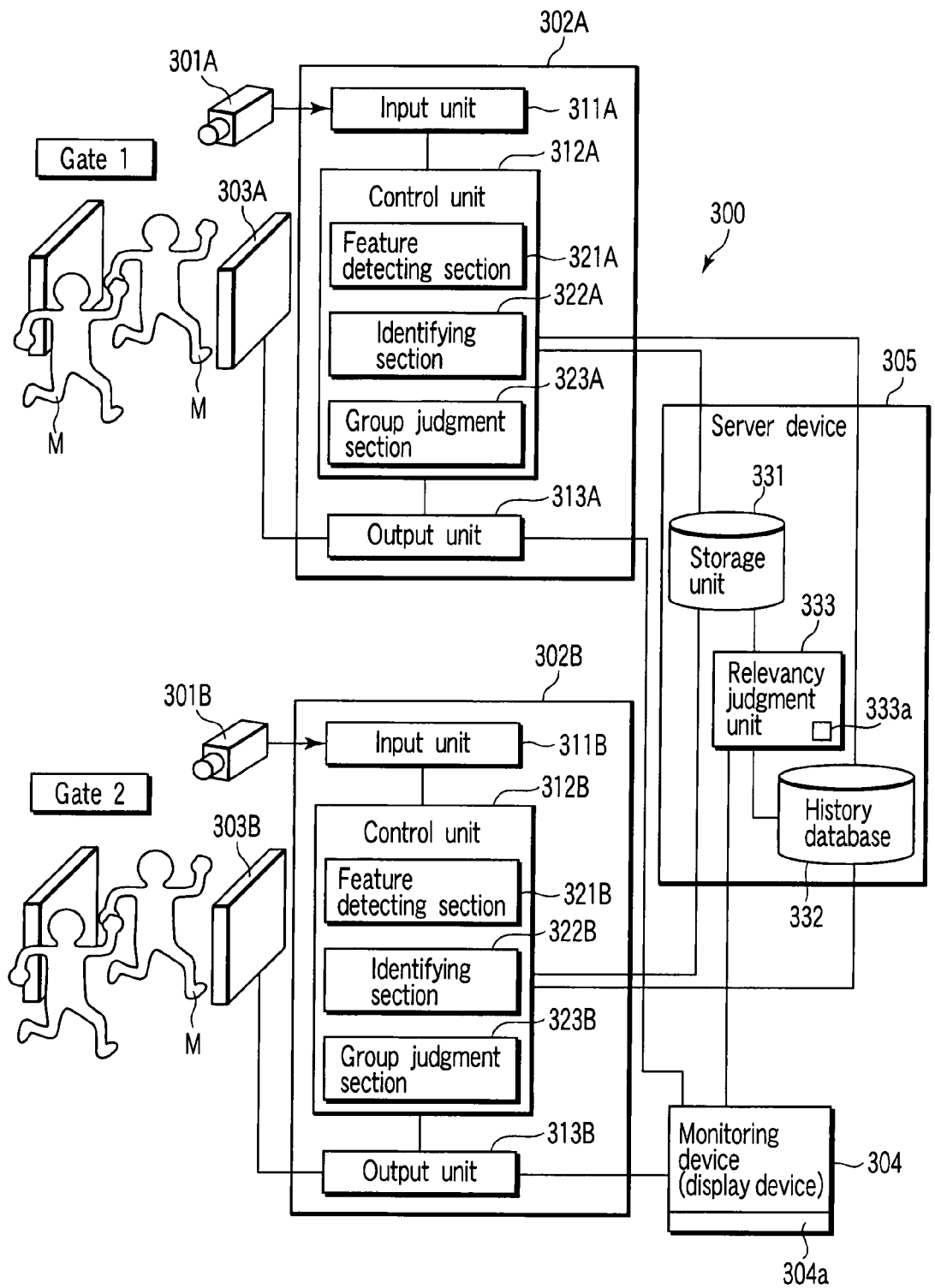
FIG. 10 is a block diagram schematically showing a constitutional example of a passer-by identification system according to a third embodiment.

FIG. 10 is a diagram schematically showing a constitutional example of a passer-by identification system 300 according to a third embodiment.

In this third embodiment, as shown in FIG. 10, the passer-by identification system 300 is assumed which is constituted of a camera 301, a plurality of passer-by identification devices 302A, 302B, a plurality of gate devices 303A, 303B, a monitoring device 304, a server device 305 and the like. Each passer-by identification device 302 (302A, 302B) is constituted of an input unit (an image input unit) 311 (311A, 311B), a control unit 312 (312A, 312B), an output unit 313 (313A, 313B) and the like. Furthermore, each control unit 312 (312A, 312B) has a feature detecting section 321 (321A, 321B), an identifying section 322 (322A, 322B), a group judgment section 323 (323A, 323B) and the like.

It is to be noted that the above constitution of the passer-by identification system 300 can appropriately be modified in accordance with an operating configuration or the like. For example, each constitution of the server device 305 may be disposed in either of the passer-by identification devices 302.

Moreover, in the passer-by identification system 300 shown in FIG. 10, the camera 301 (301A, 301B), the gate device 303 (303A, 303B), the input unit 311 (311A, 311B), the output unit 313 (313A, 313B), the feature detecting section 321 (321A, 321B), the identifying section 322 (322A, 322B) and the group judgment section 323 (323A, 323B) have constitutions similar to those of the camera 101, the gate device 103, the input unit 111, the output unit 113, the feature detecting section 121, the identifying section 122 and the group judgment section 123 in the passer-by identification system 100 shown in FIG. 1. Therefore, detailed description thereof is omitted.

The units of the passer-by identification system 300 will hereinafter be described in detail.

In the passer-by identification system 300, the passer-by identification devices 302A and 302B are connected to the server device 305. The server device 305 is a data server in which various data are stored and controlled. As shown in FIG. 10, the server device 305 has a storage unit 331, a history database 332 and a relevancy judgment unit 333. The server device 305 has an interface (not shown) for performing data communication with the passer-by identification device 302A, the passer-by identification device 302B and the monitoring device 304.

It is assumed that registration information (identifying information, facial feature information, a face image, group information, etc.) on each registrant, which is similar to the information of the storage unit 114 described in the first embodiment, is stored in the storage unit 331. However, the registration information stored in the storage unit 331 can appropriately be rewritten. The registration information stored in the storage unit 331 is information for use in person identification processing, group judgment processing or the like in two passer-by identification devices 302A and 302B. Therefore, the registration information stored in the storage unit 331 is appropriately read out by the passer-by identification device 302A or 302B.

In the history database 332, information such as an identification result obtained by the passer-by identification device 302A or 302B is stored as history information. As the history information stored in the history database 332, information such as information indicating a person identification result (an identified person), information indicating a photographed place (gate) and date of identification (photographing) is stored.

The relevancy judgment unit 333 determines a relevancy (group appearance) between the persons based on the information (information such as the identification result obtained by the passer-by identification devices 302A, 302B) stored in the history database 332. The judgment result by the relevancy judgment unit 333 is appropriately reflected in group information of each registrant stored in the storage unit 331.

That is, the relevancy judgment unit 333 determines the relevancy between the persons identified by the passer-by identification devices 302A, 302B based on conditions set beforehand. As the conditions for determining the relevancy among the plurality of identified persons, it is possible to set, for example, "whether or not the persons are simultaneously photographed", "whether or not the persons are continuously photographed within a predetermined time" or the like. The relevancy judgment unit 333 determines a degree of relevancy between each identified person and another person as an evaluation value of the relevancy. The evaluation value of the relevancy between the persons (the value indicating the relevancy) is stored for each person in a data table (a correlation map) 333a, and the group of the persons is determined based on the stored evaluation values.

For example, the evaluation value of the relevancy between the "simultaneously" photographed persons and the evaluation value of the relevancy between the persons photographed "continuously within the predetermined time" may be set with separate values (weighted values), respectively. In this case, the relevancy judgment unit 333 judges that the persons "simultaneously" photographed with a certain camera have "a high possibility of the group (a high relevancy, and the evaluation value is therefore set as the maximum value)". The unit judges that the persons photographed with the certain camera "continuously within the predetermined time" have "a possibility of the group (a low relevancy, and the evaluation value is therefore lowered)". The unit judges that the other persons (the persons photographed after elapse of the predetermined time or more) "are not group (do not have any relevancy, and there is not any evaluation value)".

Furthermore, the evaluation value of the relevancy may be set in a stepwise manner in accordance with a time interval while the persons are continuously photographed. For example, the evaluation value of the relevancy between the simultaneously photographed persons may be set to a first value (Level 3; e.g., the evaluation value is "3"). The value between the persons photographed within a first time (e.g., one minute) may be set to a second value (Level 2; e.g., the evaluation value is "2"). The value between the persons photographed between the first time and a second time (e.g., within five minutes) may be set to a third value (Level 1; e.g., the evaluation value is "1") which is lower than the second value. The value between the persons photographed at an interval which is not less than the second time may be set to a fourth value (Level 0; e.g., the evaluation value is "0") which is lower than the third value.

FIG. 11 is a diagram showing examples of the history information as a history of the identification result obtained by the passer-by identification device. FIG. 12 is a diagram showing an evaluation example of the relevancy with respect to the history information shown in FIG. 11.

In the example shown in FIG. 12, with respect to the history information shown in FIG. 11, the relevancy judgment unit 333 compares each identification result with the previous identification result to thereby evaluate the relevancy between the persons. That is, the relevancy judgment unit 333 successively compares the identification result obtained by each passer-by identification device 302 with the previous identification result to evaluate the relevancy between the persons. It is to be noted that here a case where each identification result of the history information shown in FIG. 11 is evaluated based on the above conditions.

First, the relevancy judgment unit 333 compares the identification result of a history number 2 with that of the previous history number 1. In a case where the identification result of the history number 2 is compared with that of the previous history number 1, since a photographing interval (a difference between dates) between the results is within the first time (one minute), the relevancy judgment unit 333 sets the evaluation value of the relevancy between a person B and a person A to "2".

Moreover, the relevancy judgment unit 333 compares the identification result of a history number 3 with that of the previous history number 2. In a case where the identification result of the history number 3 is compared with that of the previous history number 2, since the photographing interval between the results is within the second time (one minute), the relevancy judgment unit 333 sets the evaluation value of the relevancy between persons C, D and E and the person B (C and B, D and B and E and B) to "1", respectively. According to the identification result of the history number 3, since the persons C, D and E are simultaneously photographed, the relevancy judgment unit 333 sets the evaluation value of the relevancy between the persons C, D and E (C and D, D and E and E and C) to "3", respectively.

Furthermore, the relevancy judgment unit 333 compares the identification result of a history number 4 with that of the previous history number 3. In a case where the identification result of the history number 4 is compared with that of the previous history number 3, since the photographing interval between the results is within the second time or more (five minutes), the relevancy judgment unit 333 judges the relevancy between a person F and the persons C, D and E (F and C, F and D and F and E) to be "0".

When the above relevancy judgment results are put in order, the data table (the correlation map) 333a indicating correlation is generated as shown in FIG. 12. According to the correlation map shown in FIG. 12, the relevancies among the persons A to F can be evaluated. Furthermore, according to the correlation map 333a in which the above evaluation values of the relevancies are accumulated for a predetermined period, information (information indicating group dividing) indicating the correlation between the persons for the predetermined period is prepared.

It is to be noted that in the example shown in FIG. 12 shows a case where the person identified as a registrant whose registration information is beforehand stored in the storage unit 331 is associated. Such judgment of the relevancy is also applicable to a non-registrant (a case where it is judged that the person is not the registrant). In this case, an ID number is imparted to the person judged to be the non-registrant, and facial feature information of the person is associated with the ID number and beforehand stored as registration information of a temporary registrant in the storage unit 331. Each identification device also performs person identification processing by use of the registration information of the temporary registrant registered as described above. In consequence, when the person (the temporary registrant) is next photographed with any camera, the passer-by identification system identifies the person. When the temporary registrant is identified in this manner, the passer-by identification system can judge the relevancy between even the non-registrant and the above-described other person.

Moreover, the relevancy between the persons obtained as described above may be registered as loop information of the registrants based on specific conditions. For example, the relevancy judgment unit 333 of the server device 305 judges whether or not the evaluation value of the relevancy in the correlation map 333a exceeds a predetermined threshold value. In a case where the persons having the relevancy evaluation value exceeding the predetermined threshold value are determined by the above judgment, the relevancy judgment unit 333 judges that the persons belong to a group, and updates group information of the persons (the registrants). In this case, the group information of the registrants can be updated based on the evaluation value of the relevancy without any manual operation.

Furthermore, the relevancy judgment unit 333 of the server device 305 may display a guidance indicating "there is a high possibility of the group" in the monitoring device 304 or the like with respect to the persons having the relevancy evaluation value which exceeds the predetermined threshold value in the above correlation map. In this case, the observer or a system supervisor may visually confirm the above guidance, and instruct whether or not to register the persons as the group based on the confirmation result by an operating unit 304a. In this case, the relevancy judgment unit 333 of the server device 305 updates the group information of each person in response to the instruction from the observer or the system supervisor. In this case, after the observer or the system supervisor confirms the guidance, the group information of each registrant is updated. Therefore, the group can securely be controlled.

Next, a flow of judgment processing of the relevancy by the relevancy judgment unit 333 will be described.

Figure 13:
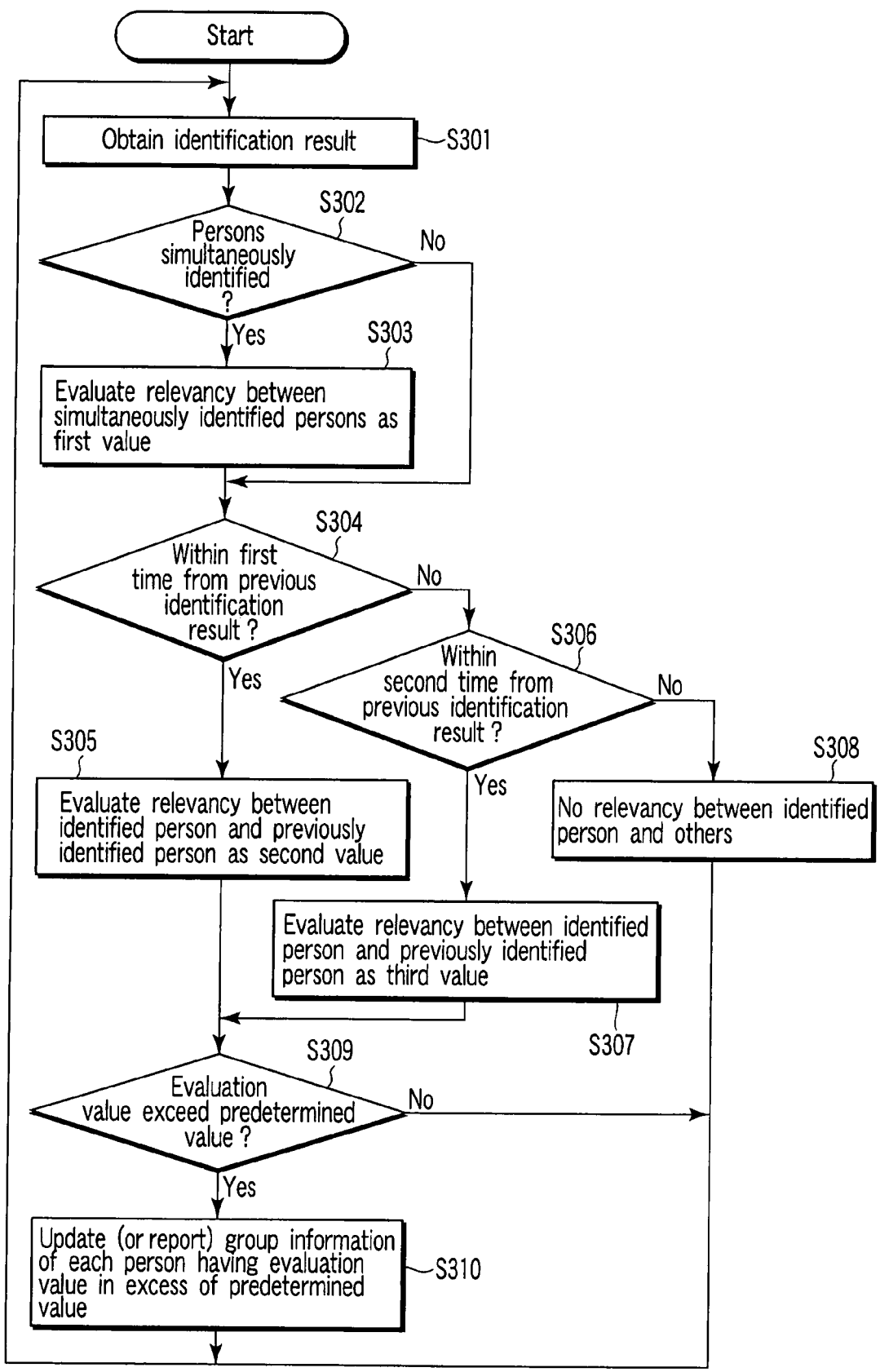
FIG. 13 is a block diagram schematically showing a constitutional example of a passer-by identification system according to a fourth embodiment.

FIG. 13 is a flow chart for explaining an example of the judgment processing of the relevancy by the relevancy judgment unit 333. It is to be noted that the above judgment processing of the relevancy may be performed every time the identification result is received from each passer-by identification device 302. Alternatively, the identification results obtained by the passer-by identification devices 302 may be accumulated in the history database 332, and the identification result accumulated in the history database 332 may periodically be read out to perform the processing.

First, it is assumed that the relevancy judgment unit 333 of the server device 305 obtains the identification result by each passer-by identification device 302 (step S301). Then, the relevancy judgment unit 333 judges whether or not there are a plurality of simultaneously identified persons (step S302). In a case where it is judged by this judgment that the plurality of persons are simultaneously identified (the step S302, YES), the relevancy judgment unit 333 evaluates the relevancy between the simultaneously identified persons to be the first value (step S303). This evaluation value of the relevancy is accumulated (voted) in the correlation map 333a indicating the relevancy between the persons.

Furthermore, the relevancy judgment unit 333 compares the obtained identification result with the previous identification result to thereby judge whether or not an interval between dates (the photographing dates) in the identification results is within the first time (step S304). That is, the relevancy judgment unit 333 judges whether or not the persons continuously identified within the first time are present. In a case where it is judged that an interval between the obtained identification result and the previous identification result is within the first time (the step S304, YES), the relevancy judgment unit 333 judges the relevancy between the person of the obtained identification result and the person of the previous identification result to be the second value (step S305). It is to be noted that the second value is assumed to be smaller than the first value.

Such an evaluation value of the relevancy is accumulated (voted) in the correlation map 333a indicating the relevancy between the persons (the person of the obtained identification result and the person of the previous identification result).

In a case where it is judged that the interval between the obtained identification result and the previous identification result is not within the first time (the step S304, NO), the relevancy judgment unit 333 compares the obtained identification result with the previous identification result to thereby judge whether or not an interval between the dates (the photographing dates) is within the second time (step S306). That is, the relevancy judgment unit 333 judges whether or not a person identified continuously within the first time or more and within the second time is present. In a case where it is judged that the interval between the obtained identification result and the previous identification result is within the second time (the step S306, YES), the relevancy judgment unit 333 evaluates the relevancy between the person of the obtained identification result and the person of the previous identification result as the third value (step S307). Such an evaluation value of the relevancy is accumulated (voted) in the correlation map 333a indicating the relevancy between the persons (the person of the obtained identification result and the person of the previous identification result).

In a case where it is judged that the interval between the obtained identification result and the previous identification result is within the second time (the step S306, NO), the relevancy judgment unit 333 evaluates that there is not any relevancy between the person of the obtained identification result and the person of the previous identification result (step S308). In this case, any evaluation value is not accumulated (voted) in the correlation map 333a indicating the relevancy between the persons (the person of the obtained identification result and the person of the previous identification result).

Furthermore, the relevancy judgment unit 333 judges whether or not the evaluation value exceeds a predetermined value in the correlation map 333a (step S309). In a case where it is judged by this judgment that the evaluation value exceeds the predetermined value (the step S309, YES), the relevancy judgment unit 333 performs processing to update the group information of each person having the relevancy evaluation value which exceeds the predetermined value (step S310).

As described above, in the processing of the step S310, the relevancy judgment unit 333 may update the group information of each person having the evaluation value of the relevancy stored in the storage unit 331 in excess of the predetermined value. Alternatively, the relevancy judgment unit may notify the monitoring device 304 of the group information of each person having the evaluation value of the relevancy in excess of the predetermined value to update the group information in response to a request for updating the group information from the monitoring device 304.

Moreover, the processing of the steps S309 and S310 may be performed every time the evaluation value is accumulated in the correlation map 333a, performed periodically or performed in response to an instruction from the observer or the system supervisor.

In the passer-by identification system according to the third embodiment, the facial feature information of the passer-by detected from the image photographed by the camera is collated with each registrant's facial feature information beforehand stored in the storage unit to thereby identify the passer-by, and a plurality of passers-by are associated with one another based on the identification result or the history of the identification result. Moreover, in the passer-by identification system, the group of the passers-by is determined based on the above association.

In consequence, according to the third embodiment, it is possible to evaluate the relevancy even between the persons which are not beforehand registered as the group, and the persons can be divided based on the relevancy between the persons.

Next, a fourth embodiment will be described.

Figure 14:
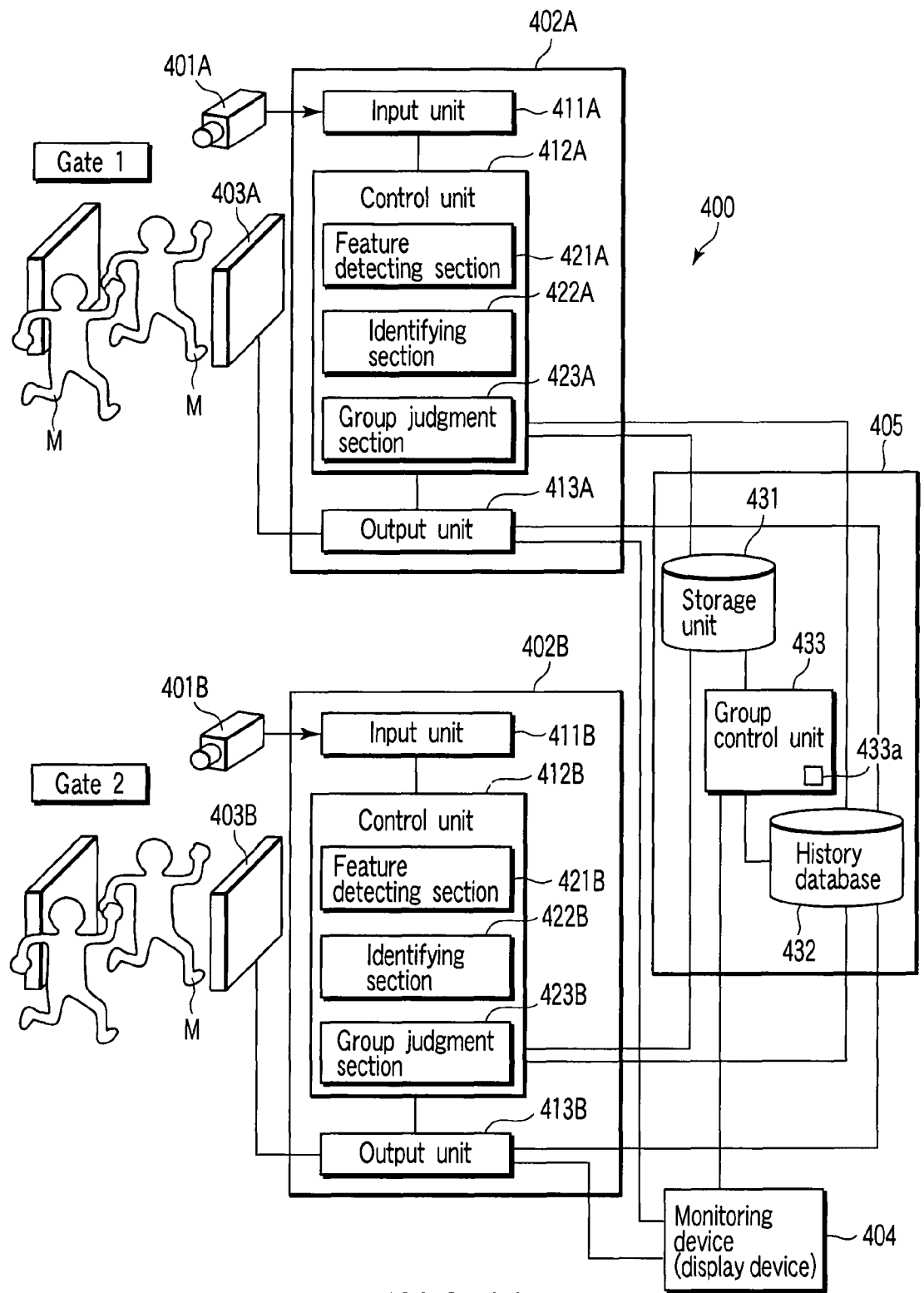
FIG. 14 is a diagram showing a processing example of a group control unit.

FIG. 14 schematically shows a constitutional example of a passer-by identification system 400 according to the fourth embodiment.

In this fourth embodiment, as shown in FIG. 14, the passer-by identification system 400 is assumed which is constituted of a camera 401, a plurality of passer-by identification devices 402A, 402B, a plurality of gate devices 403A, 403B, a monitoring device 404, a server device 405 and the like. Each passer-by identification device 402 (402A, 402B) is constituted of an input unit (an image input unit) 411 (411A, 411B), a control unit 412 (412A, 412B), an output unit 413 (413A, 413B) and the like. Furthermore, each control unit 412 (412A, 412B) has a feature detecting section 421 (421A, 421B), an identifying section 422 (422A, 422B), a group judgment section 423 (423A, 423B) and the like.

It is to be noted that the above constitution of the passer-by identification system 400 can appropriately be modified in accordance with an operating configuration or the like. For example, each constitution of the server device 405 may be disposed in either of the passer-by identification devices 402.

Moreover, in the passer-by identification system 400 shown in FIG. 14, the camera 401 (401A, 401B), the gate device 403 (403A, 403B), the input unit 411 (411A, 411B), the output unit 413 (413A, 413B), the feature detecting section 421 (421A, 421B), the identifying section 422 (422A, 422B) and the group judgment section 423 (423A, 423B) have constitutions similar to those of the camera 101, the gate device 103, the input unit 111, the output unit 113, the feature detecting section 121, the identifying section 122 and the group judgment section 123 in the passer-by identification system 100 shown in FIG. 1. Therefore, detailed description thereof is omitted.

The units of the passer-by identification system 400 will hereinafter be described in detail.

In the passer-by identification system 400, the passer-by identification devices 402A and 402B are connected to the server device 405. The server device 405 is a data server in which various data are stored and controlled. As shown in FIG. 14, the server device 405 has a storage unit 431, a history database 432 and a group control unit 433. The server device 405 has an interface (not shown) for performing data communication with the passer-by identification device 402A, the passer-by identification device 402B and the monitoring device 404.

It is assumed that registration information (identifying information, facial feature information, a face image, group information, etc.) on each registrant, which is similar to the information of the storage unit 114 described in the first embodiment, is stored in the storage unit 431. The registration information stored in the storage unit 431 is information for use in person identification processing, group judgment processing or the like in the passer-by identification devices 402A and 402B. Therefore, the registration information stored in the storage unit 431 is appropriately read out by the passer-by identification device 402A or 402B.

In the history database 432, information such as an identification result obtained by the passer-by identification device 402A or 402B is stored as history information. As the history information stored in the history database 432, information such as information indicating a person identification result (information indicating an identified person, information indicating a photographed place (gate) and date of identification (photographing)) and a group judgment result of each person are stored.

The group control unit 433 controls a state of each group based on the information (the person identification result and the group judgment result obtained by the passer-by identification devices 402A and 402B) stored in the history database 432. The group control unit 433 controls a passage state of each person through each gate for each group. The group control unit 433 has a data table 433a indicating the passage state of each person through each gate for each group. That is, the group control unit 433 determines the gate, the group of the persons who passed through the gate, a time when the persons passed through the gate and the number of the persons based on the person identification result and the group judgment result obtained by each passer-by identification device 402. This judgment result is stored as group control information in the data table 433a.

Furthermore, the group control unit 433 appropriately outputs the information (the group control information) stored in the data table 433a as display data to the monitoring device 404. The group control unit 433 may output the group control information to the monitoring device 404 every time the data table 433a is updated, or output the group control information to the monitoring device 404 in response to a request from the monitoring device 404.

FIG. 15 is a diagram showing an example of the group control information-stored in the data table 433a.

In the example shown in FIG. 15, information indicating the persons who passed through each gate at the time is stored for each group. For example, according to the example shown in FIG. 15, persons A, B and C passed through Gate 1 at 10:00, passed through Gate 2 at 10:30 and further passed through Gate 2 at 10:40. Among the persons A, B and C who passed through Gate 2 at 10:40, the persons A, C passed through Gate 1 at 11:00. However, the person B was not identified until at least 11:30. This means that the person B who acted together with the persons A, C passed through Gate 2, and then acted separately from the persons A, C of Group 1. Therefore, according to the judgment result shown in FIG. 15, it can easily be presumed that the person B acts separately from Group 1.

Moreover, according to the example shown in FIG. 15, persons D, E of Group 2 passed through Gate 1 at 10:10. The persons D and E and a person F of Group 2 passed through Gate 2 at 10:50. This means that the persons D, E who passed through Gate 1 at 10:10 passed through Gate 2 together with the person F at 10:50. Furthermore, the persons D, E of Group 2 passed through Gate 2 at 11:30. This means that the person F who passed through Gate 2 together with the persons D, E at 10:50 acted separately from the persons D, E at 11:30. Therefore, according to the data table shown in FIG. 15, it can be presumed that the person F only passed through Gate 2 together with the persons D, E of Group 2 by accident.

According to the above group control, the time when each person of each group passed through each gate and the persons passed through the gate in company with one another. Each person's action as the group can easily be presumed. For example, in a person monitoring system to which the passer-by identification system is applied, not only each person's action (passage history at each gate or the like) but also each group's action can be monitored.

In the passer-by identification system according to the fourth embodiment, the facial feature information of the passer-by detected from an image photographed by the camera is collated with each registrant's facial feature information beforehand stored in the storage unit to thereby identify the passer-by, and further the group of each passer-by is identified. In the above passer-by identification system, the above person identification result or the group judgment result is stored as the history information in the data table, and the data stored in the data table is appropriately output to an external device.

In consequence, according to the fourth embodiment, each passer-by can be monitored for each group, and each person's action of each group can easily be monitored.

Fifth to ninth embodiments will hereinafter be described.

In the fifth to ninth embodiments described hereinafter, as an operating configuration of a passer-by identification system, a person monitoring system is assumed which monitors persons in a plurality of areas. FIG. 16 is a diagram showing setting examples of a plurality of monitoring areas to be monitored by a monitoring system as the passer-by identification system according to the fifth to ninth embodiments. In the example shown in FIG. 16, in a certain security area SA, a plurality of monitoring areas Sa1 to Sa6 are set. In the passer-by identification system according to the fifth to ninth embodiments described later, it is assumed that cameras (cameras to photograph images of the monitoring areas) are set in the monitoring areas Sa1 to Sa6 in one security area SA.

Next, a fifth embodiment will be described.

Figure 17:
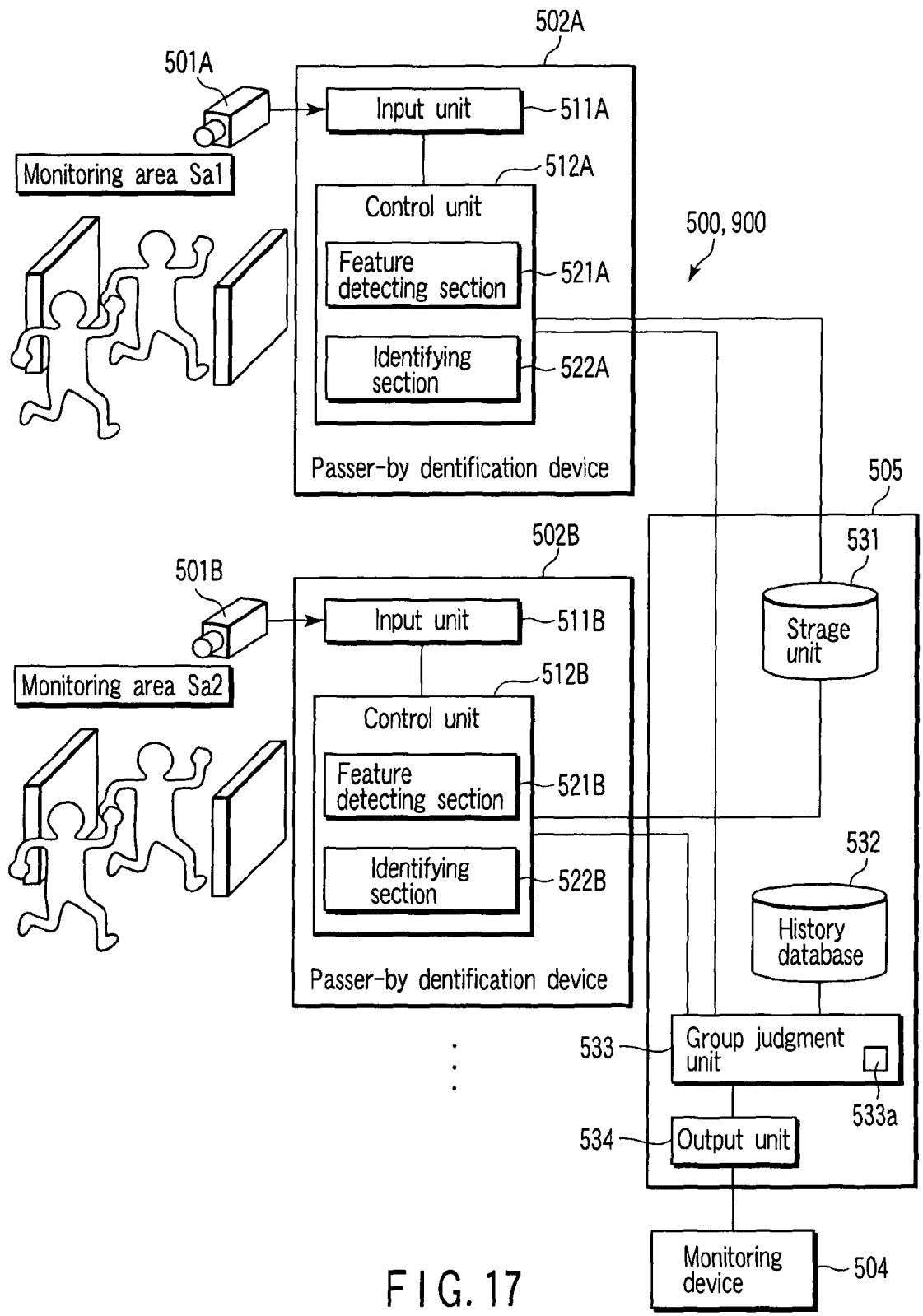
FIG. 17 is a diagram showing a constitutional example of a passer-by identification system according to a fifth embodiment.

FIG. 17 is a diagram showing a constitutional example of a passer-by identification system 500 according to the fourth embodiment.

As shown in FIG. 17, the passer-by identification system 500 is constituted of a plurality of cameras 501, a plurality of passer-by identification devices 502, a monitoring device 504, a server device 505 and the like. Each passer-by identification device 502 has an input unit 511 (511A, 511B) and a control unit 512 (512A, 512B). Furthermore, each control unit 512 (512A, 512B) has a feature detecting section 521 (521A, 521B), an identifying section 522 (522A, 522B) and the like. The server device 505 has a storage unit 531, a history database 532, a group judgment unit 533, an output unit 534 and the like.

It is to be noted that the above constitution of the passer-by identification system 500 can appropriately be modified in accordance with an operating configuration or the like. For example, each constitution of the server device 505 may be disposed in either of the passer-by identification devices 502.

Moreover, in the passer-by identification system 500 shown in FIG. 17, the camera 501 (501A, 501B), the input unit 511 (511A, 511B), the output unit 513 (513A, 513B), the feature detecting section 521 (521A, 521B) and the identifying section 522 (522A, 522B) have constitutions similar to those of the camera 101, the input unit 111, the output unit 113, the feature detecting section 121 and the identifying section 122 in the passer-by identification system 100 shown in FIG. 1. Therefore, detailed description thereof is omitted.

The units of the passer-by identification system 500 will hereinafter be described in detail.

It is assumed that registration information (identifying information, facial feature information, a face image, group information, etc.) on each registrant, which is similar to the information of the storage unit 114 described in the first embodiment, is stored in the storage unit 531. The registration information stored in the storage unit 531 is information for use in person identification processing performed in the identifying sections 522A, 522B, group judgment processing performed by the group judgment unit 533 and the like.

In the history database 532, information such as an identification result obtained by the passer-by identification device 502A or 502B and a judgment result obtained by the group judgment unit 533 are stored as history information. As the history information stored in the history database 532, information such as a person identification result (information indicating an identified person, information indicating a photographed place (a monitoring area) and date of identification (photographing)) and each person's group judgment result is stored.

The group judgment unit 533 performs processing (group judgment processing) to determine a group of each person based on the person identification result obtained by each passer-by identification device 502 and processing (judgment processing of group action) to determine a group action for each group. It is to be noted that the group judgment processing of each person in the group judgment unit 533 can be realized by a method similar to that of the group judgment processing by the group judgment section 123 described in the first embodiment. The group judgment processing of each person may be executed by each passer-by identification device 502 in the same manner as in the first embodiment.

The judgment processing of the group action by the group judgment unit 533 is processing to determine (detect) a state of the group action by a plurality of persons for each group. For example, in the fifth embodiment, as the judgment processing of the group action, the group judgment unit 533 judges whether or not the plurality of persons belonging to the same group act in a group. The group judgment unit 533 also determines an access degree between the persons. The access degree between the persons is a value indicating the access degree between the persons in a security area SA. The access degree is determined based on predetermined conditions. For example, the access degree is a value counted up (a predetermined value is integrated) every time a condition such as "the persons were present at the same time in the same place (monitoring area)" (a first condition) or "the persons accessed the security area in the same time zone" (a second condition) is satisfied. In the fifth embodiment, it is assumed that since the group judgment unit 533 determines the action by the plurality of persons (the group), the access degree between the persons is determined for each group.

First, the judgment processing of the group action by the access degree based on the first condition will be described.

The access degree based on the first condition is a value counted up (the predetermined value is integrated) every time the plurality of persons belonging to the same group are detected (identified) from one input image (an image of one monitoring area). However, even when the plurality of persons come close to one another, this does not directly or necessarily indicate that the persons act together. That is, even if the persons simultaneously detected from one input image belong to the same group, there is a possibility that the persons were present at the time in the place by accident (there is a possibility that the persons do not actually act together, and act separately from one another).

In other words, it can be judged by the only person identification result in a short time that "the plurality of persons are present together at the same time in the same place", but it is difficult to judge whether or not "the persons act in the group". Therefore, in the judgment processing of the group action by the access degree based on the first condition, when "a length of time when the persons are present together" is not less than a predetermined time (or "the number of the times when the persons are judged to be present together" is not less than the predetermined number of the times), it is judged that "the persons act together". To determine the length of the time when the persons are present together as described above, it is necessary to judge whether or not the plurality of persons continuously come close to one another. Here, it is assumed that the group judgment unit 533 judges by a data table (an access map) 533a to store the access degree between the persons whether or not the plurality of persons act together.

FIG. 18 is a diagram showing an example of the access map 533a prepared by the passer-by identification system according to the fifth embodiment. The example shown in FIG. 18 indicates an example of the access map 533a indicating the access degree between the persons in a certain monitoring area.

In the access map 533a, a value indicating the length of the time when the persons are present together is stored as the access degree. Therefore, when the plurality of persons of the same group are continuously (successively) detected (identified) from the same input image (an image obtained by photographing the certain monitoring area), the access degree between the persons is updated (counted up) every predetermined time. For example, if the access degree among the plurality of persons belonging to the same group continuously identified from the same input image is updated (counted up) every minute, the access degree stored in the access map 533a is a value indicating the number of the minutes when the plurality of persons are present together. Specifically, if the access degree is counted up every minute, it is indicated that persons A and B indicating an access degree of "12" were present together in the monitoring area for 12 minutes. According to such an access map 533a, the persons who were present together, the place where the persons were present, the time when the persons were present and an access state between the persons can easily be known.

Next, a flow of the judgment processing of the group action by the access degree based on the first condition will be described.

Figure 19:
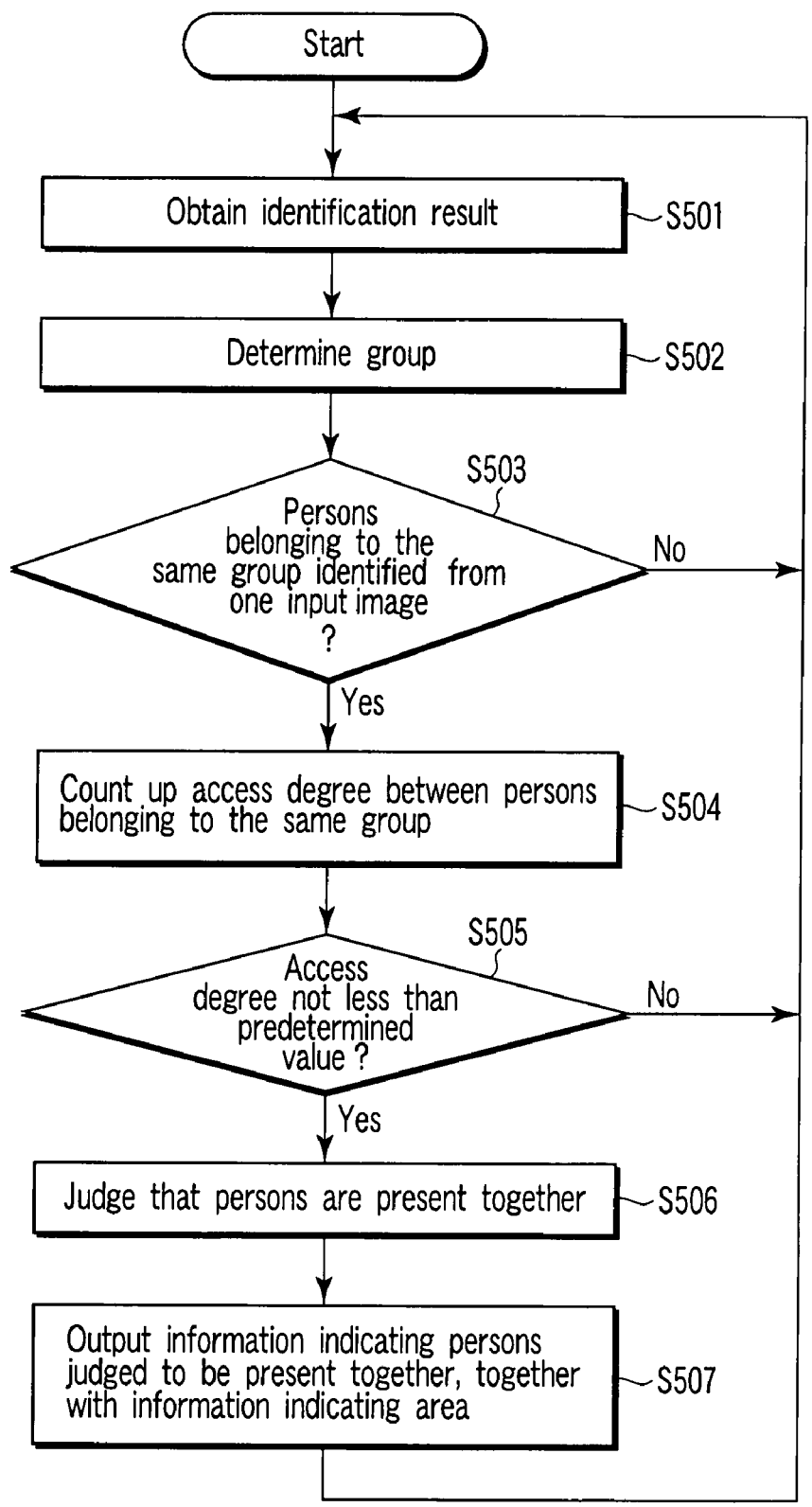
FIG. 19 is a flow chart for explaining an example of judgment processing of a group action.

FIG. 19 is a flow chart for explaining an example of the judgment processing of the group action by the access degree based on the first condition.

First, the group judgment unit 533 successively obtains identification results from each passer-by identification device 502 or the history database 532 (step S501). It is to be noted that here the identification result of one person or the plurality of persons obtained from one input image is assumed to be one identification result. When the identification result is obtained, the group judgment unit 533 determines the groups of all the persons identified in the identification result with reference to the registration information stored in the storage unit 531 (step S502). It is to be noted that the group of the persons may be determined by each passer-by identification device 502. In this case, it is assumed that the information indicating the group of each person is included in the identification result. In this case, it is assumed that the group judgment unit 533 determines the groups of all the persons from such an identification result.

When the groups of all the identified persons are determined, the group judgment unit 533 judges whether or not a plurality of persons belonging to the same group have been detected (identified) from the same input image (step S503). In a case where it is judged that the plurality of persons belonging to the same group have not been identified from one input image (the step S503, NO), the group judgment unit 533 returns to the step S501 to repeatedly execute the above processing.

Moreover, in a case where the above judgment judges that the plurality of persons belonging to the same group have been identified from one input image (the step S503, YES), the group judgment unit 533 counts up the access degree between the persons with respect to the access map 533a of the monitoring area where the input image was photographed (step S504). It is to be noted that in a case where the access degree among the plurality of persons simultaneously detected in each input image is continuously updated (counted up), the access degree among the persons is assumed to be updated every predetermined time.

When the access degree among the plurality of persons (the plurality of simultaneously photographed persons) belonging to the same group identified from one input image is counted up, the group judgment unit 533 judges whether the access degree between the persons is not less than a predetermined value (step S505). In a case where this judgment judges that the access degree is less than the predetermined value (the step S505, NO), the group judgment unit 533 returns to the step S501 to repeatedly execute the above processing.

Moreover, in a case where the above judgment judges that the access degree is not less than the predetermined value (the step S505, YES), the group judgment unit 533 judges that the persons take the group action (act together) (step S506). When it is judged that the plurality of persons take the group action, the group judgment unit 533 supplies, to the output unit 534, information indicating the persons judged to take the group action together with information indicating the monitoring area where the plurality of persons taking the group action were photographed (step S507).

In consequence, the output unit 534 outputs, to the monitoring device 504, the information indicating the monitoring area together with the information indicating the persons judged to take the group action and information indicating the group. In consequence, the monitoring device 504 can display information indicating, for example, "the monitoring area where the persons take the group action and the persons". The output unit 534 may output, to the monitoring device 504, control information for generating a warning or the like in accordance with the group (or a precaution degree of each group) of the plurality of persons judged to act together.

Moreover, according to the first condition, it is judged that the plurality of persons belonging to the same group were detected in one monitoring area. That is, in the judgment processing of the group action by the access degree based on the first condition, it is judged whether or not the plurality of persons take the group action for each monitoring area. According to such a judgment result, the output unit 534 may perform output processing in accordance with an importance degree for each monitoring area where the plurality of persons taking the group action were detected. This is because the monitoring areas Sa1 to Sa6 sometimes differ with the importance degree (a security level) even in one security area SA. In the security area SA, there might be a case where an area having a high importance degree (e.g., a place where several persons of a specific group are present without any problem) and an area having a low importance degree (e.g., a place where precautions are taken against several persons of the specific group) are mixed. In such a case, when the importance degree is set to each monitoring area, the passer-by identification device can perform the output processing to notify the external device of a warning or the like in accordance with the importance degree of each monitoring area.

For example, in a case where there is a room (the most important area) where important objects are controlled as one of the monitoring areas in a building (the security area) where a plurality of monitoring cameras are installed, the importance degree of each monitoring area in the security area may be set to be higher as the monitoring area comes closer to the most important area. In such a case, the system can be operated so as to increase a warning level as a certain group comes close to the most important area as described above.

FIG. 20 is a diagram showing a setting example of the importance degree with respect to a plurality of monitoring areas.

In the example shown in FIG. 20, the importance degrees of the monitoring areas Sa1, Sa2 and Sa3 are set to "3", "1" and "2", respectively. Furthermore, the importance degree of a monitoring area San is set to "5". Therefore, in a case where the plurality of persons of the same group are identified in the monitoring area San having the highest importance degree, an warning to the effect takes top priority. The example shown in FIG. 20 indicates general judgment values for judging a priority order to output the warning to the external device. As shown in, for example, FIG. 20, the general judgment value is obtained by integrating values obtained by multiplying the importance degrees of the monitoring areas with the number of the detected persons. In the example shown in FIG. 20, Group 2 has the highest general judgment value. Therefore, when the judgment result shown in FIG. 20 is obtained, the output unit 534 notifies the monitoring device 504 of the warning indicating that two persons of Group 2 are present in the monitoring area San with the top priority.

As described above, in the passer-by identification system, the importance degree is beforehand set to the monitoring area to thereby perform the output processing in accordance with the importance degree of each monitoring area where the group of the persons acting together has been detected. In consequence, it is possible to efficiently monitor the group of the persons acting together in the important monitoring area or a monitoring area close to the important area.

Next, the judgment processing of the group action in accordance with the access degree based on the above second condition will be described.

The access degree based on the above second condition is determined by judging whether or not the plurality of persons of the same group are present in the security area in the same period of time. For example, the access degree based on the second condition is determined based on a time when the plurality of persons belonging to the same group enter or exit from the security area. In this case, the access degree between "the plurality of persons who entered the security area at substantially the same time" or between "the plurality of persons who exited from the security area at substantially the same time" is counted up (a predetermined value is integrated). In other words, the access degree based on the second condition is a value for judging whether or not the plurality of persons belonging to the same group act in the security area in the same period of time.

For example, there might be a case where a plurality of persons who take actions such as handing-over and waiting on business for a short time only come close to one another for a short time, and enter from separate entrances or exit from separate exits. That is, there might be a case where the plurality of persons having the purpose of the handing-over or the waiting act as the group, but hardly act together.

In such a case, it is difficult to judge, in accordance with the access degree based on the first condition, that the persons act together. On the other hand, in accordance with the access degree based on the second condition, it is possible to specify a plurality of persons belonging to the same group who were present in the security area in at least the same period of time (who entered or exited from the security area). It is to be noted that in the following description, it is assumed that the access degree based on the second condition is determined in accordance with an entering or exiting time of each person with respect to the security area.

Moreover, it is assumed that the access degree based on the second condition is controlled using the access map 533a. For example, a case is assumed where the security area includes a plurality of monitoring areas provided with the exits and the entrances. In this case, in the plurality of monitoring areas provided with the exits and entrances, the access degrees of the plurality of persons belonging to the same group who entered the security area in the same period of time (or exited from the security area) are set to be high (counted up) in the access map 533a. According to such an access map 533a, the plurality of persons of the same group who accessed the area in the same period of time can easily be distinguished.

Here, as shown in FIG. 16, it is assumed that the security area SA is provided with the exits/entrances in the monitoring areas Sa1, Sa2 and Sa3. For example, in a case where a time when the person A was detected in the monitoring area Sa1 and a time when the person B was detected in the monitoring area Sa2 are within a predetermined time, when the persons A and B belong to the same group, the group judgment unit 533 integrates the access degree between the person A and the person B in the access map 533a. According to such processing, in the access map 533a, the access degree between the persons who accessed the security area SA in the same period of time increases. When these results are integrated to indicate a predetermined value or more, the group judgment unit 533 judges that the plurality of persons of the same group are present.

Moreover, in the monitoring areas Sa1, Sa2 and Sa3 which are the exits/entrances of the security area SA, a camera which photographs entering persons and a camera which photographs exiting persons may be installed. In this case, the person detected from an image photographed by the camera which photographs the entering persons is a person entering the security area SA, and the person detected from an image photographed by the camera which photographs the exiting persons is a person exiting from the security area SA. According to such a constitution, it is easy to distinguish between the person entering the security area and the person exiting from the security area.

Next, a flow of the judgment processing of the group action in accordance with the access degree based on the second condition will be described.

Figure 21:
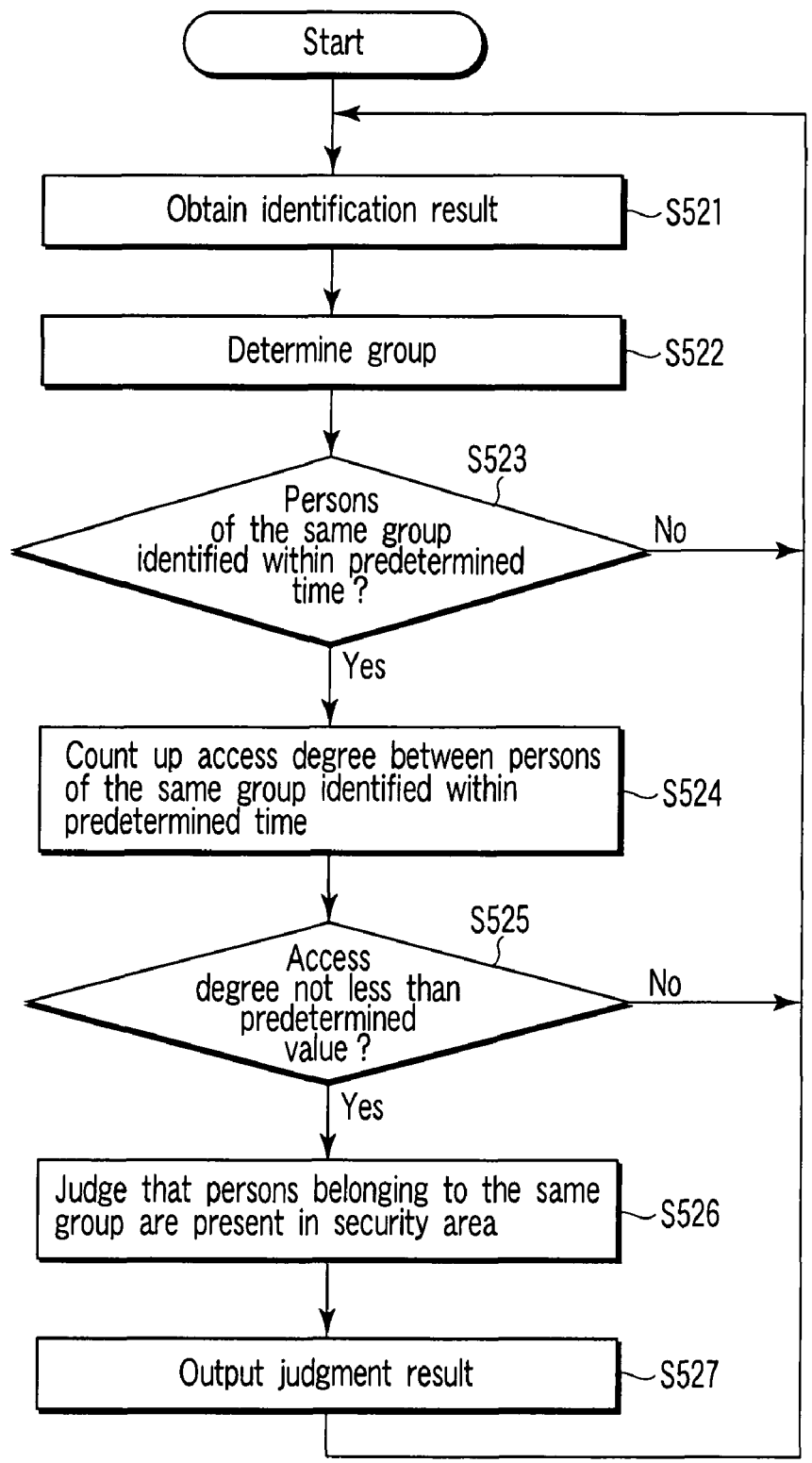
FIG. 21 is a flow chart for explaining an example of the judgment processing of the group action.

FIG. 21 is a flow chart for explaining an example of the judgment processing of the group action in accordance with the access degree based on the second condition.

First, the group judgment unit 533 successively obtains identification results from each passer-by identification device 502 or the history database 532 (step S521). It is to be noted that in a case where the only entering time and exiting time with respect to the security area are judgment objects, the group judgment unit 533 may obtain the only identification results from the image photographed in any of the monitoring areas Sa1, Sa2 and Sa3 having the exits/entrances of the security area SA.

On obtaining the identification results, the group judgment unit 533 determines the group of the persons identified from the identification result with reference to the registration information stored in the storage unit 531 (step S522). It is to be noted that the group of the persons may be described with each passer-by identification device 502.

On determining the group of the persons, the group judgment unit 533 judges whether or not the person who belongs to the same group as that of the person detected at a time from the identification result is detected (identified) in any of the monitoring areas in the security area SA within a predetermined time from the time (step S5523). For example, in a case where the entering time or the exiting time with respect to the security area are judgment objects, the group judgment unit 533 judges whether or not the person of the same group is detected in the monitoring areas Sa1, Sa2 and Sa3 having the exits/entrances within the predetermined time.

In a case where the above judgment judges that the person belonging to the same group is not detected within the predetermined time (the step S523, NO), the group judgment unit 533 returns to the step S521 to repeatedly execute the above processing. In a case where the above judgment judges that the person belonging to the same group is detected within the predetermined time (the step S523, YES), the group judgment unit 533 counts up the access degree between the person identified in the identification result and the person belonging to the same group detected within the predetermined time (step S524).

When the access degree among the plurality of persons belonging to the same group detected within the predetermined time is counted up, the group judgment unit 533 judges whether the access degree between the persons is not less than a predetermined value (step S525). In a case where this judgment judges that the access degree is less than the predetermined value (step S525, NO), the group judgment unit 533 returns to the step S521 to repeatedly execute the above processing.

Moreover, in a case where the above judgment judges that the access degree is the predetermined value or more (the step S525, YES), the group judgment unit 533 judges that there is a possibility that the persons act as the group in the security area SA (step S526). In a case where it is judged that there is a possibility that the plurality of persons of the same group act together, the group judgment unit 533 supplies, to the output unit 534, information indicating the persons having a possibility of acting as the group and information indicating the group (step S527).

In consequence, the output unit 534 outputs, to the monitoring device 504, information indicating the persons of the same group detected in any of the monitoring areas of the security area within the predetermined time. In consequence, in the monitoring device 504, for example, information indicating that "the persons of the same group are present in the security area" can be displayed. The output unit 534 might output, to the monitoring device 504, control information indicating that a warning or the like is generated with respect to the group (or a precaution degree of each group) judged to have a possibility that the plurality of persons act together.

According to the access degree based on the second condition, even in a case where the persons act together for an only short time, it can be judged that the plurality of persons belonging to the same group who tend to be present in the security area in the same period of time might act as the group. Furthermore, based on an access pattern (the entering time or the exiting time) of each person, it is possible to detect and report the plurality of persons who might perform the group action in the security area.

Moreover, the judgment of the access degree based on the second condition is applicable to a specific group only. For example, an only group having a high precaution degree as an object may be subjected to the judgment of the access degree based on the second condition. In consequence, it can be detected that the plurality of persons belonging to the group having the high precaution degree seem to act in the security area in the same period of time. If the plurality of persons belonging to the group having the high precaution degree are present in the security area in the same period of time, it is predicted that there is a high possibility that the persons take a highly dangerous action. As a result, the access degree of each person belonging to the specific group having a high precaution degree can be determined in accordance with the above second condition to thereby support sufficient precaution.

It is to be noted that the access degree based on the above first condition and the access degree based on the above second condition may be combined to generally judge whether or not the plurality of persons belonging to the same group perform the group action in the security area. In this case, the access degree based on the first condition and the access degree based on the second condition may be counted up in one access map, respectively.

In the above passer-by identification system 500, in a case where it is detected that the plurality of persons belonging to the same group are continuously present together in an arbitrary area for a predetermined period (a time or the number of the times of identification), it is judged that the persons act together, and the judgment result is output to an external device. In a case where the plurality of persons belonging to the same group are detected in an area such as the exit/entrance of the security area in the same period of time, it is judged that the plurality of persons belonging to the same group are present in the security area in the same period of time (or the plurality of persons belonging to the same group have a similar action pattern), and this effect is output to the external device.

In consequence, the observer can easily identify each group of the persons acting together, and can take an appropriate action in accordance with the action of each group. The observer can easily recognize that the persons of the group having a high precaution degree act together or that there is a high possibility that the persons act together, and can quickly and exactly prepare security precaution. It is also possible to output the warning in accordance with the group of the persons acting together, the number of the persons and the importance degree of each monitoring area. Therefore, the observer can intuitively and easily recognize a security level in response to the warning in accordance with the precaution degree.

Next, a sixth embodiment will be described.

Figure 22:
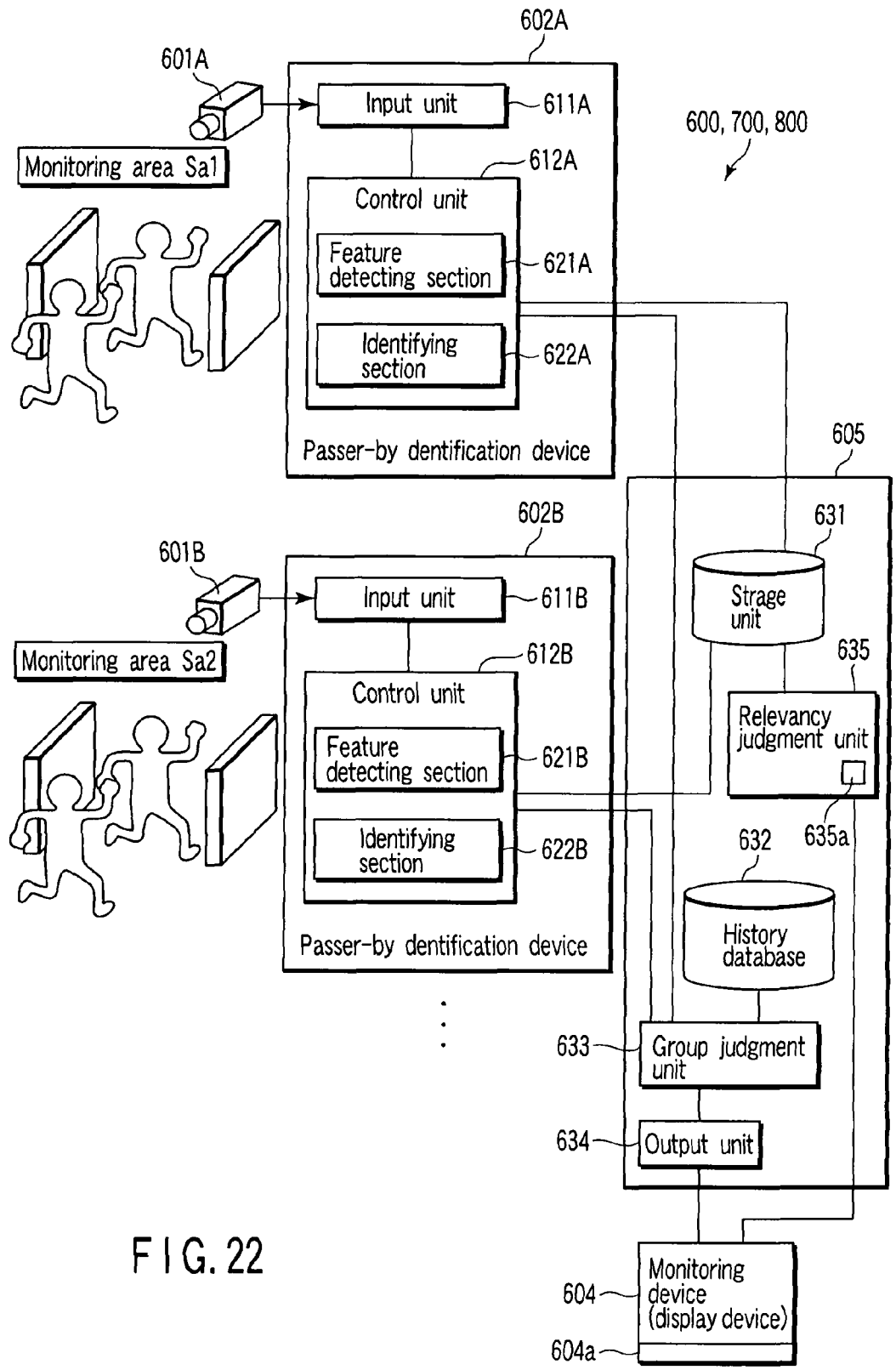
FIG. 22 is a block diagram showing a constitutional example of a passer-by identification system according to a sixth embodiment.

FIG. 22 is a block diagram showing a constitutional example of a passer-by identification system 600 according to a sixth embodiment.

As shown in FIG. 22, the passer-by identification system 600 is constituted of a plurality of cameras 601 (601A, 601B), a plurality of passer-by identification devices 602, (602A, 602B), a monitoring device 604, a server device 605 and the like. Each passer-by identification device 602 has an input unit 611 (611A, 611B) and a control unit 612 (612A, 612B). Furthermore, each control unit 612 (612A, 612B) has a feature detecting section 621 (621A, 621B), an identifying section 622 (622A, 622B) and the like. The server device 605 has a storage unit 631, a history database 632, a group judgment unit 633, an output unit 634, a relevancy judgment unit 635 and the like. It is to be noted that the above constitution of the passer-by identification system 600 can appropriately be modified in accordance with an operating configuration or the like. For example, each constitution of the server device 605 may be disposed in either of the passer-by identification devices 602.

Moreover, in the passer-by identification system 600 shown in FIG. 22, the camera 601, the input unit 611, the control unit 612, the storage unit 631, the history database 632, the group judgment unit 633 and the output unit 634 have constitutions similar to those of the camera 501, the input unit 511, the control unit 512, the storage unit 531, the history database 532, the group judgment unit 533 and the output unit 534 in the passer-by identification system 500 shown in FIG. 17, respectively. Therefore, detailed description thereof is omitted.

The passer-by identification system 600 shown in FIG. 22 is constituted by disposing the relevancy judgment unit 635 which determines a relevancy between persons from history information of an identification result in the server device of the passer-by identification system 500 shown in FIG. 17. The relevancy judgment unit 635 performs relevancy judgment processing similar to that of the relevancy judgment unit 333 described above in the third embodiment shown in FIG. 10. The relevancy judgment unit 635 performs processing to vote (accumulate) an evaluation value indicating the relevancy between the persons in a correlation map 635a by a technique similar to that of the relevancy judgment unit 333 described above in the third embodiment.

Figure 23:
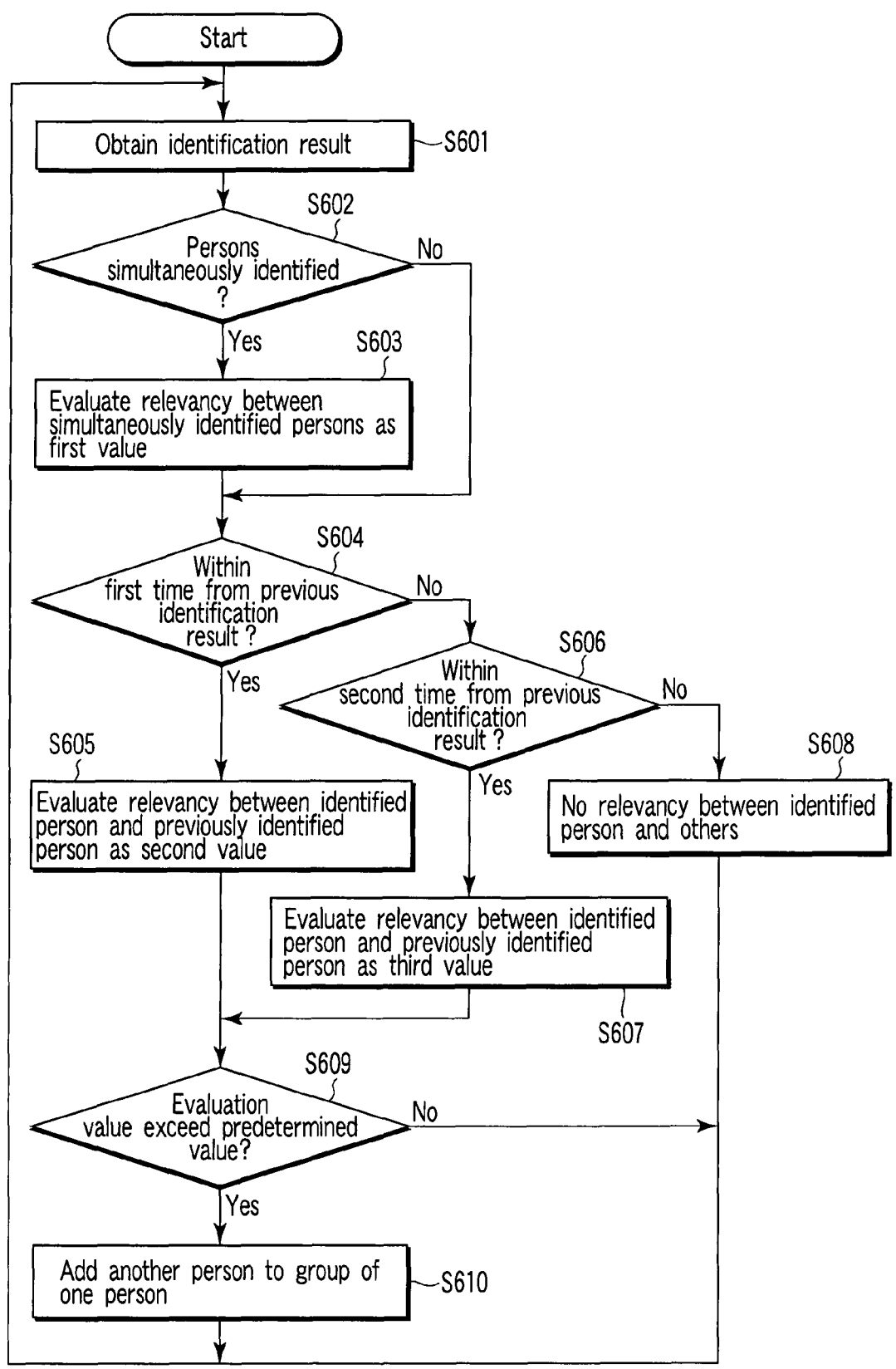
FIG. 23 is a flow chart for explaining an example of a flow of judgment processing of relevancies obtained by a relevancy judgment unit of the sixth embodiment.

FIG. 23 is a flow chart for explaining a flow of the judgment processing of the relevancy by the relevancy judgment unit 635 of the sixth embodiment. It is to be noted that processing of steps S601 to S609 of the flow chart shown in FIG. 23 is similar to that of the steps S301 to S309 of the flow chart described in the third embodiment shown in FIG. 13. Therefore, detailed description thereof is omitted.

That is, the relevancy judgment unit 635 judges that another person should be added to a group to which one person belongs among a plurality of persons (the plurality of persons having the evaluation value of the relevancy which is not less than a predetermined value) judged to have a high relevancy (step S610). In other words, the relevancy judgment unit 635 is different from the above relevancy judgment unit 333 in that the persons having the relevancy evaluation value which is not less than the predetermined value are grouped based on the present group information of the persons.

For example, in a case where the evaluation value of the relevancy between the person A and the person B is not less than the predetermined value, the relevancy judgment unit 635 judges that the person A and the person B seem to belong to the same group. In a case where the persons A and B seem to belong to the same group, when the person A belongs to Group 1, the relevancy judgment unit 635 adds Group 1 to the group information of the person B or notifies the monitoring device 604 of information that the person B seems to belong to Group 1.

FIG. 24 is a diagram showing examples of the history information of the identification result obtained by each passer-by identification device 602. FIG. 25 is a diagram showing an evaluation example of the relevancy based on the history information of the identification result. With respect to the history information of the identification result shown in FIG. 24, the relevancy between the persons (a registrant and a non-registrant) is evaluated by a technique (comparison of each identification result with the previous identification result) described above in the third embodiment. In the example shown in FIG. 24, it is judged that a relevancy between a registrant A and a registrant B is a level 2, it is judged that relevancies between the registrant B and a registrant C and between the registrant B and a non-registrant X are a level 1, respectively, it is judged a relevancy between the non-registrant X and the registrant C is a level 3, and it is judged that a relevancy between a registrant D and a registrant E is level 3. When such evaluations of the relevancy between the persons are put in order, the correlation map 635a shown in FIG. 25 is obtained.

Moreover, in the example shown in FIG. 24, the relevancy between even a person judged to be the non-registrant X and a person identified as another registrant is evaluated. In the example shown in FIG. 24, it is evaluated that the non-registrant X has a high relevancy to the simultaneously identified registrant C (identified from one input image). Such a non-registrant does not have registration information such as facial feature information stored in the storage unit 631. Therefore, with respect to the non-registrant, the group information stored in the storage unit 631 cannot be updated automatically. That is, for grouping of the non-registrant with another person (the registrant), it is necessary to allow an observer or a system supervisor to judge whether or not the registration information (the facial feature information, etc.) of the non-registrant should be stored in the storage unit 631. Therefore, when the non-registrant is evaluated to have a high relevancy to the registrant, a face image of the person (the non-registrant) detected during identification processing and the like are displayed together with information indicating the relevancy to each registrant in the monitoring device 604. In consequence, the registration information of the non-registrant is registered in the storage unit 631 based on the judgment of the observer or the system supervisor, and the group information of the non-registrant can be set based on the relevancy between the non-registrant and the registrant.

It is to be noted that an ID number of the non-registrant may be assigned to the feature information of a face detected from the input image, and the information may be stored as information (temporary registration information) of the non-registrant in the storage unit 631. In this case, when the non-registrant is subsequently subjected to the identification processing in the system, the non-registrant can be collated as the non-registrant of the above ID number with the feature information of the face detected from the input image. In consequence, it is possible to continuously evaluate the relevancy between even the non-registrant and the other registrant or the other non-registrant having the assigned ID number.

Moreover, the group information between the registrants judged to have a high relevancy may be updated based on the judgment of the observer or the system supervisor. In this case, the relevancy judgment unit 635 allows the monitoring device 604 to display the information on the plurality of persons evaluated as the high relevancy. The observer or the system supervisor who has visually checked such a display operates an operating section 604a to instruct that the persons evaluated as the high relevancy be registered as the group. In a case where the observer or the system supervisor instructs that the displayed group information of the persons be updated, the monitoring device 604 requests the relevancy judgment unit 635 to update the group information of the persons. On receiving the request for updating the group information of the persons from the monitoring device 604, the relevancy judgment unit 635 updates the group information of the persons stored in the storage unit 631. In consequence, after the group information of the persons is visually checked by the observer or the system supervisor, the information can be updated. In this case, since the observer or the system supervisor can visually check update contents of the group information, the group can securely be controlled.

Next, a seventh embodiment will be described.

The seventh embodiment is a first modification of the sixth embodiment. Therefore, it is assumed that a passer-by identification system 700 according to the seventh embodiment has a constitution described above in the sixth embodiment shown in FIG. 22. However, in the passer-by identification system 700 according to the seventh embodiment, it is assumed that group information indicating a special group (an authenticated group) different from another group is stored as registration information of an authenticated registrant. In the seventh embodiment, in a case where there is a high relevancy between persons of the authenticated group and persons of another group, an evaluation value of the relevancy of the persons is reset, or the group information is updated according to a special rule.

FIG. 26 is a diagram showing examples of the registration information stored in a storage unit 631 of the passer-by identification system 700 according to the seventh embodiment.

In the example shown in FIG. 26, in addition to the registration information described above in the first embodiment shown in FIG. 3, information indicating a group judged to have been "authenticated" is added. It is assumed that a person belonging to the "authenticated" group is a securely reliable person under the control of the security area by a system supervisor, an observer or the like. For example, the system can be operated so as to avoid automatic registration of a person who acts together with the authenticated person (i.e., the person evaluated as a person having a high relevancy to the authenticated person) as the authenticated group or avoid the registration of the person in a negative group (group having a high precaution degree) such as a suspicious person.

Figure 27:
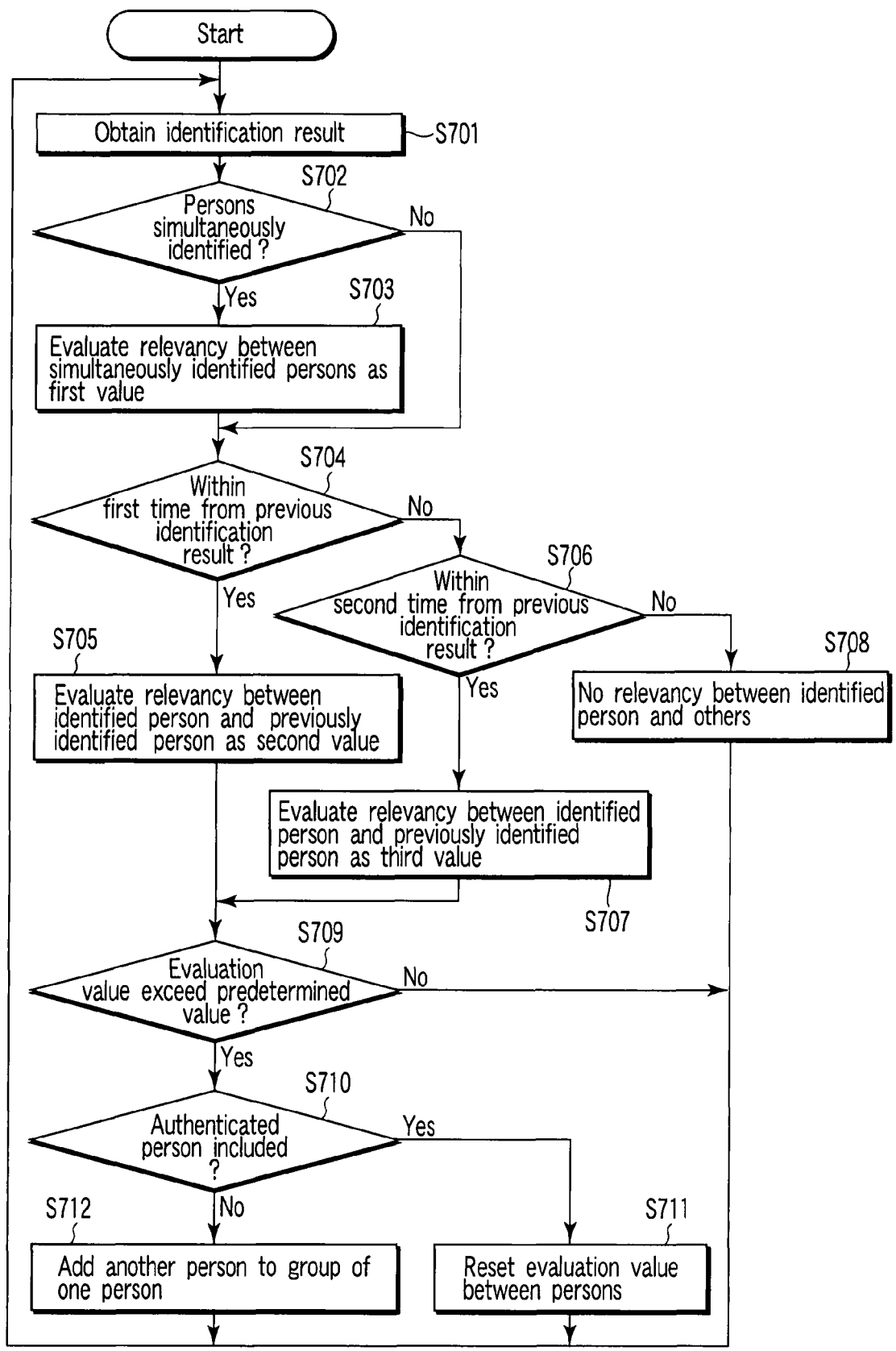
FIG. 27 is a flow chart for explaining an example of a flow of judgment processing of relevancies obtained by a relevancy judgment unit of the seventh embodiment.

FIG. 27 is a flow chart for explaining a flow of relevancy judgment processing performed by a relevancy judgment unit 635 of the seventh embodiment. It is to be noted that processing of steps S701 to S709 of the flow chart shown in FIG. 27 is similar to that of the steps S301 to S309 of the flow chart described above in the third embodiment shown in FIG. 13. Therefore, detailed description thereof is omitted. Moreover, since processing of step S712 of FIG. 27 is similar to that of the step S610 of FIG. 23 described above in the sixth embodiment, detailed description thereof is omitted.

That is, the relevancy judgment unit 635 of the seventh embodiment judges whether or not a plurality of persons judged to have a high relevancy (the plurality of persons having the evaluation value of the relevancy which is not less than a predetermined value) include the person (the authenticated person) belonging to the "authenticated" group (step S710). In a case where this judgment judges that the authenticated person is included (the step S710, YES), the relevancy judgment unit 635 resets the evaluation values of the plurality of persons (i.e., the evaluation value with respect to the person belonging to the "authenticated" group) (step S711).

In consequence, even in a case where the person belonging to the "authenticated" group is evaluated as a person having a high relevancy to a specific group (e.g., a group requiring caution in the example shown in FIG. 26), the information is reset. That is, the passer-by identification system 700 does not evaluate the relevancy of the person belonging to the "authenticated" group to another group. It is to be noted that the relevancy of a person judged to have a high relevancy to the person belonging to the "authenticated" group to the specific group may not be evaluated.

Moreover, the authenticated group is a special group which is different from another group. Therefore, to avoid the automatic registration of the person of a group other than the authenticated group in the passer-by identification system, voting of the evaluation value indicating the relevancy to the person belonging to the authenticated group in a correlation map may be avoided. However, an operating configuration of the passer-by identification system is set in accordance with a security policy. Therefore, if it is permitted to automatically add the person of the other group to the group authenticated in the security policy, the evaluation value indicating the relevancy of the person belonging to the authenticated group to another person may be voted in the correlation map.

As described above, in the passer-by identification system according to the seventh embodiment, in addition to the processing of the passer-by identification system described above in the sixth embodiment, the relevancy of each person belonging to a special group such as the authenticated group to the other person is not evaluated. In consequence, according to the seventh embodiment, it is possible to prevent an apparently reliable person (the authenticated person) from being registered in an inappropriate group by mistake or prevent others from being registered in the authenticated group. As a result, the groups of the persons in the security area can highly precisely be controlled.

Next, an eighth embodiment will be described.

The eighth embodiment is a second modification of the sixth embodiment. Therefore, it is assumed that a passer-by identification system 800 according to the eighth embodiment has a constitution described above in the sixth embodiment shown in FIG. 22. However, in the passer-by identification system 800 according to the eighth embodiment, a technique to determine a relevancy between persons is different from that described above in the sixth embodiment. That is, in the eighth embodiment, even in separate monitoring areas in a security area, the relevancy between the persons detected (identified) in the same period of time is judged to be high.

For example, in a case where the persons access separate exits/entrances, if the persons access the security area in the same period of time, the relevancy between the persons is judged to be high. Such a relevancy judgment technique is similar to the access degree judgment processing based on the second condition described above in the fifth embodiment. That is, in the passer-by identification system according to the eighth embodiment, the relevancy between the persons is evaluated based on similarity of action patters between the persons in that the persons are present, enter the security area or exit from the security area in the same period of time.

In consequence, it is possible to evaluate the relevancy even between the persons who come close to each other for an only short time in the security area for the purpose of waiting, handing-over or the like. In other words, in the eighth embodiment, even in the case where persons separately act in the security area (the persons are not simultaneously detected in the same monitoring area), if the persons tend to be present in the security area in the same period of time (the persons have similarity in action pattern), the relevancy between the persons is judged to be high.

Next, a processing example performed by a relevancy judgment unit 635 of the passer-by identification system according to this eighth embodiment will be described.

Figure 28:
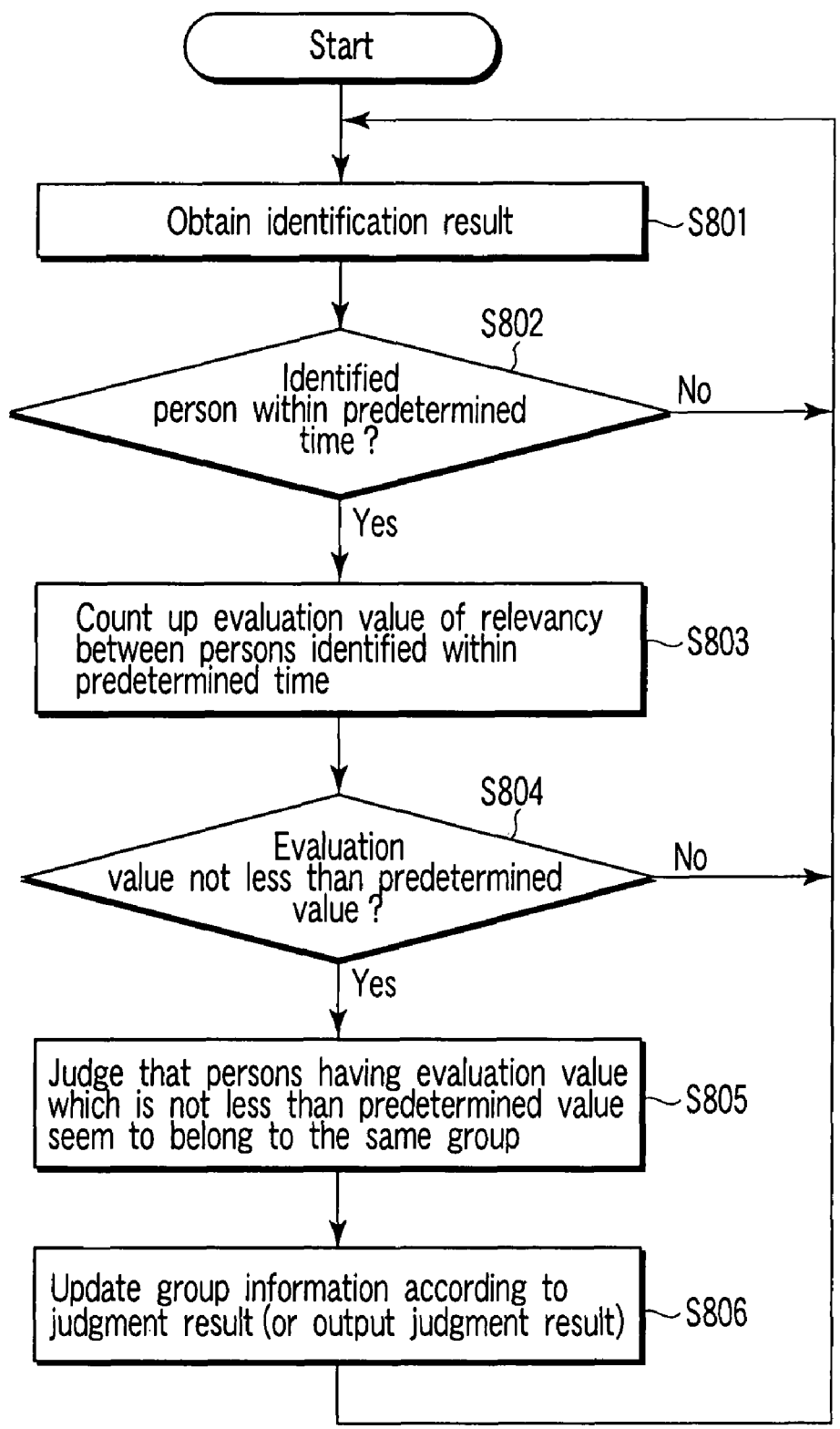
FIG. 28 is a flow chart for explaining judgment processing of relevancies obtained by a passer-by identification system according to an eighth embodiment.

FIG. 28 is a flow chart for explaining relevancy judgment processing by the relevancy judgment unit 635 of the passer-by identification system according to this eighth embodiment.

First, the relevancy judgment unit 635 successively obtains an identification result from each passer-by identification device 602 or a history database 632 (step S801). Here, it is assumed that the identification result stored in the history database 632 includes at least information indicating a date (a photographing date of an input image), the monitoring area (a photographing place of the input image) and an identified person. It is to be noted that in a case where an only entering or exiting person with respect to the security area is a relevancy judgment object, the relevancy judgment unit 635 may obtain an only identification result from an image photographed in any of monitoring areas Sa1, Sa2 and Sa3 provided with entrances or exits with respect to a security area SA.

On obtaining the identification result, the relevancy judgment unit 635 judges based on a date included in the identification result whether or not another person is detected (identified) in any of the monitoring areas of the security area SA within a predetermined time (step S802). It is to be noted that in a case where an only entering or exiting time with respect to the security area is a judgment object, the relevancy judgment unit 635 judges whether or not the other person is detected (identified) in any of the monitoring areas Sa1, Sa2 and Sa3 having the entrances or the exits within the predetermined time.

In a case where the above judgment judges that the other person is not detected within the predetermined time (the step S802, NO), the relevancy judgment unit 635 returns to the step S801 to repeatedly execute the above processing. In a case where the above judgment judges that the other person is detected within the predetermined time (the step S802, YES), the relevancy judgment unit 635 sets a high evaluation value of the relevancy between the persons detected within the predetermined time (i.e., counts up a value between the persons in a correlation map 635a (step S803). It is to be noted that even when a plurality of persons are detected in the same monitoring area within the predetermined time, the evaluation value of the relevancy between the persons may be counted up. In this case, a value which is larger than the evaluation value of the relevancy between the persons detected in the separate monitoring areas may be integrated in the correlation map 635a. In consequence, the correlation map 635a is prepared in which a value weighted in accordance with the detected monitoring area is voted.

On counting up the evaluation value of the relevancy between the plurality of persons detected within the predetermined time, the relevancy judgment unit 635 judges whether the evaluation value between the persons is not less than a predetermined value (step S804). In a case where this judgment judges that the evaluation value is less than the predetermined value (the step S804, NO), the relevancy judgment unit 635 returns to the step S801 to repeatedly execute the above processing.

Moreover, in a case where the above judgment judges that the evaluation value is not less than the predetermined value (the step S804, YES), the relevancy judgment unit 635 judges that there is a high possibility that the persons belong to the same group (step S805). In a case where it is judged that the persons seem to belong to the same group, the relevancy judgment unit 635 performs processing to update group information of the persons stored in a storage unit 631 (step S806). It is to be noted that the update processing of the group information updates the person group information stored in the storage unit 631 so as to add the other person to the group to which one person belongs as described in the sixth embodiment.

Furthermore, in the step S806, an output unit 634 may output the above judgment result to a monitoring device 604 as an external device instead of the processing to update the group information. In this case, the relevancy judgment unit 635 may update the group information in response to a request from the monitoring device 604.

In addition, when the above processing is repeatedly performed for a predetermined period, information indicating a plurality of persons who tend to be present in the security area in the same period of time or who tend to access the exits/entrances many times in the same period of time is statistically accumulated in the correlation map. According to such a correlation map, it is possible to judge that the plurality of persons who are present in the security area in the same period of time or who access the exits/entrances many times in the same period of time seem to belong to the same group.

It is to be noted that in the in the same manner as in the fifth embodiment, a camera which photographs a person who enters the security area and a camera which photographs a person who exits from the security area may be installed in each monitoring area provided with the exit/entrance. In this case, it is possible to distinguish between the entering person and the exiting person.

According to the eighth embodiment, it is possible to judge that even the persons who act together for a short time for the purpose of waiting, handing-over or the like are the persons who tend to access the security area in the same period of time. This has an effect that the plurality of persons who seem to perform a group action in the security area are detected based on an access pattern of each person.

Next, a ninth embodiment will be described.

The ninth embodiment is, for example, a modification of the fifth embodiment. Therefore, it is assumed that a passer-by identification system 900 according to the ninth embodiment has a constitution described in the fifth embodiment shown in FIG. 17. In the passer-by identification system 900 according to the ninth embodiment, in a case where groups of a plurality of persons including a person (or a specific person) belonging to a specific group are detected, even if the plurality of persons do not belong to the same group, a warning is notified to a monitoring device.

In the fifth embodiment, the plurality of persons belonging to the same group are detected. Therefore, in the fifth embodiment, in a case where the plurality of persons belonging to the specific group are detected, the system can be operated so as to notify the monitoring device of the warning. On the other hand, in the ninth embodiment, the plurality of persons including the person belonging to the specific group are detected. In consequence, according to the ninth embodiment, in a case where at least one person belonging to the specific group is detected, the system can be operated so as to notify the monitoring device of the warning.

That is, in the passer-by identification system 900 according to the ninth embodiment, based on a person identification result obtained by each passer-by identification device 502, a group judgment unit 533 performs processing (group judgment processing) to determine the group of the persons and processing (group action judgment processing) to determine a group action of each group. It is to be noted that the person group judgment processing in the group judgment unit 533 can be realized in the same manner as in the group judgment processing performed by the group judgment section 123 described above in the first embodiment. The group judgment processing of the persons may be executed by each passer-by identification device 502 in the same manner as in the first embodiment.

The judgment processing of the group action by the group judgment unit 533 is processing to judge whether or not the plurality of persons including the person belonging to the specific group perform the group action. Therefore, it is assumed that the group judgment unit 533 determines an access degree between the person belonging to the specific group (or the specific person) and another person (a non-registrant, a person belonging to another group or a person who does not belong to any group). The access degree is described based on predetermined conditions as described above in the fifth embodiment. The conditions for determining the access degree include, for example, a condition that "the persons were present in the same place (the monitoring area) at the same time" (a first condition), a condition that "the persons accessed a security area in the same period of time" (a second condition) and the like. Here, processing to judge whether or not the plurality of persons including the person belonging to the specific group perform the group action in accordance with the access degree based on the first condition will be described.

FIG. 29 is a diagram showing an example of an access map 533*a* prepared in the passer-by identification system 900 according to the ninth embodiment. It is assumed that an example shown in FIG. 29 is an example of the access map 533*a* indicating the access degree between the persons in a certain monitoring area.

In the example of the access map 533*a* shown in FIG. 29, a value indicating a length of time when the person were present together is stored as the access degree in the same manner as in FIG. 18. That is, in a case where the plurality of persons of the same group are successively (continuously) detected (identified) from the same input image (an image obtained by photographing the certain monitoring area), the access degree between the persons is updated (counted up) every predetermined time. In the example of the access map 533*a* shown in FIG. 29, it is indicated that the group of the persons and a security level associated with each group are set. Furthermore, in the example of the access map 533*a* shown in FIG. 29, even the access degree of the non-registrant is voted.

For example, in an example shown in FIG. 12, a high access degree is set between a person E belonging to a group requiring caution and a non-registrant A. If the access degree between the person E belonging to the group requiring caution (the specific group) and the non-registrant A exceeds a predetermined threshold value, the group judgment unit 533 of the passer-by identification system 900 judges that the person E and the non-registrant A perform the group action. In this case, an output unit 534 notifies a monitoring device (an external device) 504 of a warning having a security level 5 associated with the group requiring caution (the specific group).

It is to be noted that when the non-registrant is first detected, a face image and facial feature information of the non-registrant and an automatically assigned ID number (identification information) are stored as information (temporary registration information) of the non-registrant in the storage unit 531. In consequence, in a case where even the non-registrant is detected twice or more, the identification can be performed in accordance with the above information of the non-registrant.

Next, a flow of the judgment processing of the group action according to the ninth embodiment will be described.

Figure 30:
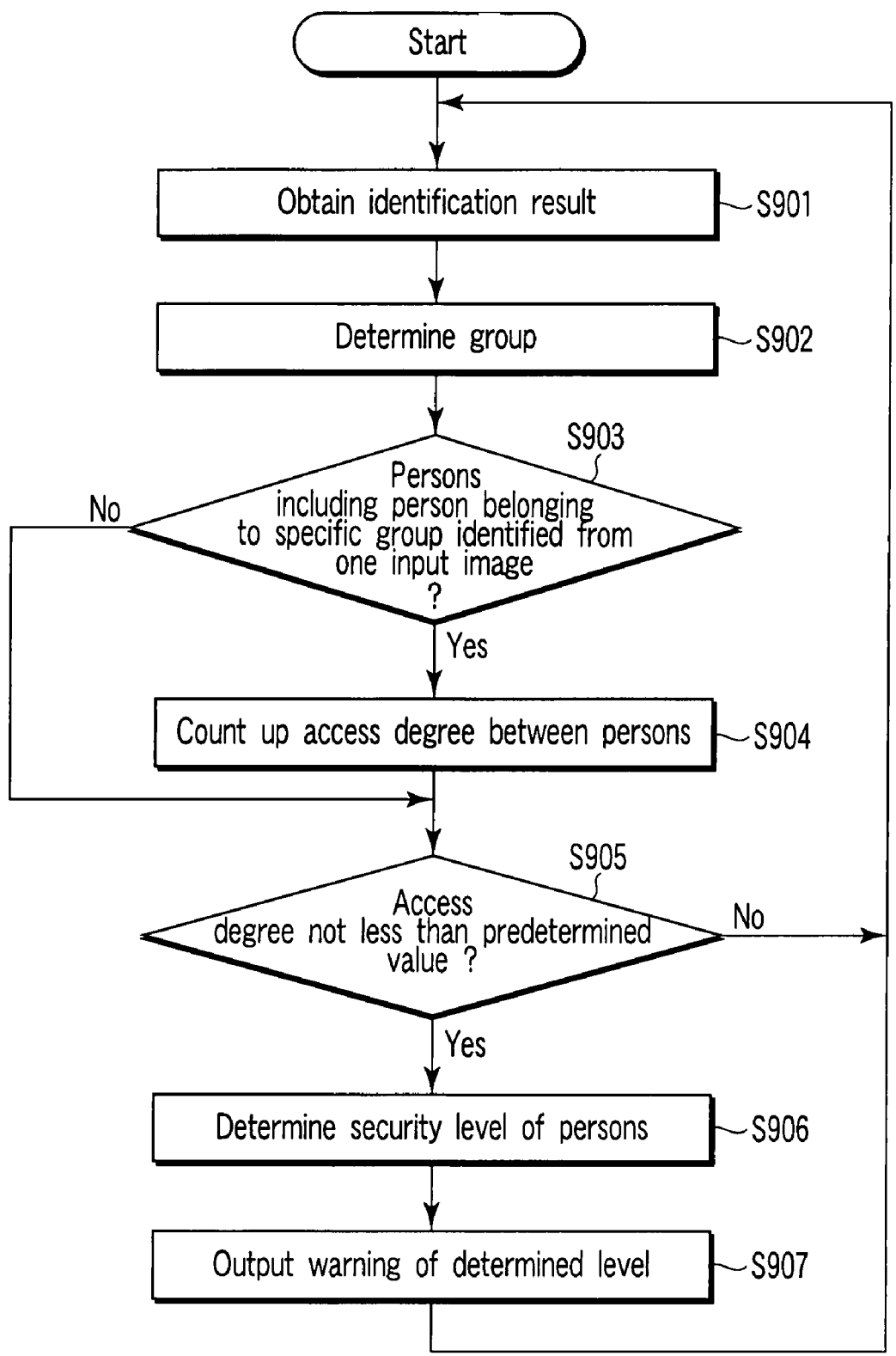
FIG. 30 is a flow chart for explaining an example of judgment processing of a group action according to a ninth embodiment.

FIG. 30 is a flow chart for explaining an example of the judgment processing of the group action in accordance with the access degree based on the first condition.

First, the group judgment unit 533 successively obtains an identification result from each passer-by identification device 502 or a history database 532 (step S901). On obtaining the identification result, the group judgment unit 533 determines the groups of all the persons identified from the identification result with reference to registration information stored in a storage unit 531 (step S902). On determining the groups of all the identified persons, the group judgment unit 533 judges whether or not the plurality of persons including the person belonging to the specific group have been identified from one input image (step S903). In a case where it is judged that the plurality of persons including the person belonging to the specific group have not been identified from one input image (the step S903, NO), the group judgment unit 533 returns to the step S901 to repeatedly execute the above processing.

Moreover, in a case where the above judgment judges that the plurality of persons including the person belonging to the specific group have been identified from one input image (the step S903, YES), the group judgment unit 533 counts up the access degree between the person belonging to the specific group and another person with respect to the access map 533*a* of the monitoring area where the input image was photographed (step S904). It is to be noted that in a case where the access degree among the plurality of persons simultaneously identified from one input image is continuously updated (counted up), the access degree among the persons is assumed to be updated every predetermined time.

Moreover, on counting up the access degree among the plurality of persons identified from one input image and including the person belonging to the specific group, the group judgment unit 533 judges whether the access degree between the persons is not less than a predetermined value (step S905).

In a case where this judgment judges that the access degree is less than the predetermined value (the step S905, NO), the group judgment unit 533 returns to the step S901 to repeatedly execute the above processing.

Moreover, in a case where the above judgment judges that the access degree is not less than the predetermined value (the step S905, YES), the group judgment unit 533 determines a security level of the group action performed by the persons (step S906). It is to be noted that the security level of each group is associated with the group and set. In a case where a security level of Group 3 is set to "5", if the plurality of persons including the person belonging to Group 3 are judged to take the group action, the group judgment unit 533 supplies, to the output unit 534, information for transmitting a warning having a security level "5" to the monitoring device 504. In consequence, the output unit 534 transmits the warning of the security level "5" to the external device.

As described above, according to the ninth embodiment, it is judged that the plurality of persons including the person belonging to the specific group perform the group action. In a case where it is detected that the plurality of persons including the person belonging to the specific group perform the group action, the external device is notified of the warning with the security level associated with the specific group.

In consequence, it can be detected that the plurality of persons including the specific person or the person belonging to the specific group perform the group action. It is further possible to issue the warning with the security level associated with the specific group. Especially, it can be detected that the non-registrant and the person belonging to the specific group perform the group action. As a result, for example, it is possible to effectively guard against a group of suspicious persons and the like, and high security can be realized.

It is to be noted that the above passer-by identification system according to each embodiment may be operated in conjunction with a system installed in another peripheral security area. For example, the passer-by identification system which monitors the specific area as shown in FIG. 16 can share information such as the registration information or the history information in conjunction with the system installed in the other peripheral security area. Such a configuration can be realized by, for example, installing a communication function with another system in the above passer-by identification device or the server device of each embodiment to share the information and the like stored in the storage unit of the passer-by identification device or the server device with the other system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A person identification device which identifies a person, comprising:
 a storage unit in which at least one piece of biometric information of a registrant and attribute information indicating attributes of registrants that are associated with each other are stored;
 an information obtaining unit which obtains information obtained by monitoring at least one monitoring area;
 a detection unit which detects biometric information of at least one person from the information obtained by the information obtaining unit;
 an identification unit which collates the biometric information detected by the detection unit with the biometric information stored in the storage unit to identify the person associated with the detected biometric information;
 a group judgment unit which judges whether or not a plurality of persons having attributes set in advance are present at the same time in a specified area based on the information obtained by the information obtaining unit and an identification result obtained by the identification unit from the biometric information detected by the detection unit; and
 an output unit which outputs a warning having information and a level set in advance to an external device, if the group judgment unit judges that the plurality of persons are present at the same time in the specified area,
 wherein, when the group judgment unit judges that the plurality of persons have the attribute of a single group, the warning information and level to be output from the output unit are changed in accordance with the attribute of the group and the number of the persons.

2. The person identification device according to claim 1, wherein the output unit performs processing to output, to a display device, display data to display an identification result obtained by the identification unit and the judgment result obtained by the group judgment unit.

3. The person identification device according to claim 1, further comprising:
 a relevancy judgment unit which evaluates relevancies among a plurality of persons identified by the identification unit and which updates the attribute information of each person stored in the storage unit based on the evaluation of the relevancy between the persons.

4. The person identification device according to claim 1, further comprising:
 wherein the output unit outputs information indicating each person identified by the identification unit, if the group judgment unit judges that the plurality of persons are present at the same time in the specified area.

5. The person identification, device according to claim 1, wherein the output unit outputs a warning having a level set in association with the specified area to the external device, if the group judgment unit judges that the plurality of persons are present at the same time in the specified area.

6. The person identification device according to claim 1, wherein
 the output unit outputs a warning having a level set in association with the specified area to the external device, if the group judgment unit judges that the plurality of persons are present at the same time in the specified area.

7. The person identification device according to claim 1, wherein in a case where the plurality of persons belongs to the same group, and the biometric information of the plurality of persons is detected in the same period of time from image information successively input by a plurality of input units provided in respective areas to be determined as areas to be monitored, the group judgment unit judges that the plurality of persons are present in the same period of time.

8. The person identification device according to claim 1, wherein in a case where the biometric information of the plurality of persons is detected from images picked up by a camera provided in the specified area, for a predetermined time period, the group judgment unit judges that the plurality of persons are present at the same time in the specified area.

9. The person identification device according to claim 1, further comprising:
a relevancy judgment unit which updates, if attribute information of the persons present at the same time in the specified area are different, the attribute information of the persons to cause the attribute information to be same as the attribute information of any one of the persons.

10. The person identification device according to claim 9, wherein the relevancy judgment unit initializes the attribute information of the persons present at the same time in the specified area, if the attributes of the persons are different, and the attribute of any one of the persons is a predetermined attribute.

11. The person identification device according to claim 1, wherein the larger the number of persons judged by the group judgment unit to be present at the same time in the specified area, the larger the number of external devices.

12. The person identification device according to claim 1, wherein the larger the number of persons judged by the group judgment unit to be present at the same time in the specified area, the louder the output volume of the warning.

13. The person identification device according to claim 1, wherein the larger the number of persons judged by the group judgment unit to be present at the same time in the specified area, warning information having a greater importance is output.

14. The person identification device according to claim 1, wherein the larger the number of persons judged by the group judgment unit to be present at the same time in the specified area, the louder the output volume of the warning.

15. The person identification device according to claim 1, wherein the larger the number of persons judged by the group judgment unit to be present at the same time in the specified area, warning information having a greater importance is output.

16. A person identification method of identifying a person, comprising:
storing, in a storage device, at least one piece of biometric information of a registrant and attribute information indicating attributes of registrants that are associated with each other;
obtaining information by monitoring at least one monitoring area via an image acquiring device;
detecting the biometric information of at least one person from the information obtained by monitoring the at least one monitoring area;
collating, via a processing device, the detected biometric information with the stored biometric information to identify the person associated with the detected biometric information;
judging whether or not a plurality of persons having attributes set in advance are present at the same time in a specified area based on the obtained information of the at least one monitoring area and an identification result obtained from the detected biometric information; and
outputting a warning having information and a level set in advance to an external device, if the judging determines that the plurality of persons are present at the same time in the specified area,
wherein, when it is judged that the plurality of persons have the attribute of a single group, the warning information and level to be output are changed in accordance with the attribute of the group and the number of the persons.

17. The person identification method according to claim 16, wherein the outputting performs processing to output, to a display device, display data to display an identification result and the grouping result.

18. The person identification method according to claim 16, further comprising:
evaluating relevancies among a plurality of identified persons, and updating the attribute information of each person stored in the storage unit based on the evaluation of the relevancy between the persons.

19. The person identification method according to claim 16, further comprising:
controlling information indicating each identified person for each group based on the grouping result,
wherein the outputting outputs information indicating each identified person, the information being controlled for each group.

20. The person identification method according to claim 16, wherein
the outputting outputs the warning having a level set in association with the specified area to an external device, if it is judged that the plurality of persons are present at the same time in the specified area.

21. The person identification method according to claim 16, wherein
the outputting outputs the warning having a level set in association with the specified area, if it is judged that the plurality of persons are present at the same time in the specified area.

22. The person identification method according to claim 16, wherein in a case where the plurality of persons belong to the same group and the biometric information of the plurality of persons is detected in the same period of time from the-image information successively input by a plurality of input units provided in respective areas to be determined as areas to be monitored, the judging determines that the plurality of persons are present in the same period of time.

23. The person identification method according to claim 16, wherein in a case where the biometric information of the plurality of persons is detected from images picked up by a camera provided in the specified area for a predetermined time period, the judging determines that the plurality of persons are present at the same time in the specified area.

24. The person identification method according to claim 16, further comprising:
updating, if attribute information of the persons present at the same time in the specified area are different, the attribute information of the persons to cause the attribute information to be same as the attribute information of any one of the persons.

25. The person identification method according to claim 24, wherein the updating initializes the attribute information of the persons present at the same time in the specified area, if the attributes of the persons are different, and the attribute of any one of the persons is a predetermined attribute.

26. The person identification method according to claim 16, wherein the larger the number of persons judged by the group judgment unit to be present at the same time in the specified area, the larger the number of external devices.

* * * * *